United States Patent
Ku et al.

(10) Patent No.: US 10,490,794 B2
(45) Date of Patent: Nov. 26, 2019

(54) ELECTRODE-COMPOSITE SEPARATOR ASSEMBLY FOR LITHIUM BATTERY AND LITHIUM BATTERY INCLUDING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Junhwan Ku, Seongnam-si (KR); Jeongkuk Shon, Hwaseong-si (KR); Minsang Song, Seongnam-si (KR); Sangmin Ji, Yongin-si (KR); Jaeman Choi, Seongnam-si (KR); Myungkook Park, PoSuwon-si (KR); Byungmin Lee, Suwon-si (KR); Hana Kim, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 287 days.

(21) Appl. No.: 15/235,302

(22) Filed: Aug. 12, 2016

(65) Prior Publication Data
US 2017/0092915 A1 Mar. 30, 2017

(30) Foreign Application Priority Data
Sep. 25, 2015 (KR) .......................... 10-2015-0137098

(51) Int. Cl.
*H01M 10/052* (2010.01)
*H01M 2/16* (2006.01)
(Continued)

(52) U.S. Cl.
CPC .......... *H01M 2/166* (2013.01); *C08F 220/18* (2013.01); *C08L 53/00* (2013.01); *H01M 2/1673* (2013.01);
(Continued)

(58) Field of Classification Search
CPC ....................... H01M 10/052; H01M 10/0525
See application file for complete search history.

(56) References Cited

U.S. PATENT DOCUMENTS 3,093,498 A 6/1963 Whittemore et al.
7,811,700 B2 10/2010 Hennige et al.
(Continued)

FOREIGN PATENT DOCUMENTS

JP  2010-231957 A  10/2010
JP  5553021 B2  6/2014
(Continued)

OTHER PUBLICATIONS

European Search Report for European Patent Application No. 16184296.8 dated Jan. 13, 2017.

(Continued)

*Primary Examiner* — Olatunji A Godo
(74) *Attorney, Agent, or Firm* — Cantor Colburn LLP

(57) ABSTRACT

An electrode-composite separator assembly for a lithium battery includes: an electrode; and a composite separator, wherein the composite separator includes: a copolymer including a first repeating unit represented by Formula 1, a second repeating unit represented by Formula 2, and a third repeating unit represented by Formula 3; at least one selected from an inorganic particle and an organic-inorganic particle; and at least one polymer selected from a fluorinated polymer and a heat-resistant polymer, wherein Formulas 1-3 are (Continued)

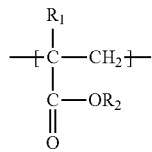

Formula 1

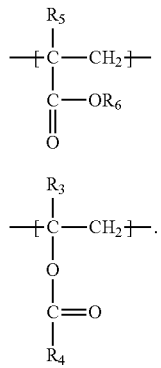

Formula 2

Formula 3

Also a lithium battery including the electrode composite separator assembly.

27 Claims, 18 Drawing Sheets

(51) Int. Cl.
  C08L 53/00 (2006.01)
  H01M 10/0525 (2010.01)
  H01M 10/0562 (2010.01)
  C08F 220/18 (2006.01)
(52) U.S. Cl.
  CPC ...... H01M 10/052 (2013.01); H01M 10/0525 (2013.01); H01M 10/0562 (2013.01); *Y02T 10/7011* (2013.01)

(56) References Cited

U.S. PATENT DOCUMENTS

| | | |
|---|---|---|
| 9,172,074 B2 | 10/2015 | Weber et al. |
| 2005/0221192 A1 | 10/2005 | Hennige et al. |
| 2010/0206804 A1* | 8/2010 | Weber .................. H01M 2/162 210/500.21 |
| 2011/0135987 A1 | 6/2011 | Shin |
| 2014/0227603 A1 | 8/2014 | Ogata |
| 2014/0302399 A1 | 10/2014 | Saimen et al. |
| 2015/0030933 A1 | 1/2015 | Goetzen et al. |
| 2015/0340676 A1 | 11/2015 | Schmidhauser et al. |

FOREIGN PATENT DOCUMENTS

| | | |
|---|---|---|
| KR | 1020080010166 A | 1/2008 |
| KR | 1020110045640 A | 5/2011 |
| KR | 1020110064689 A | 6/2011 |
| KR | 1020150059621 A | 6/2015 |
| KR | 1020150064438 A | 6/2015 |
| WO | 2014/071144 A1 | 5/2014 |
| WO | 2015076611 A1 | 5/2015 |

* cited by examiner

ELECTRODE-COMPOSITE SEPARATOR ASSEMBLY FOR LITHIUM BATTERY AND LITHIUM BATTERY INCLUDING THE SAME

CROSS-REFERENCE TO RELATED APPLICATION

This application claims the benefit of and priority to Korean Patent Application No. 10-2015-0137098, filed on Sep. 25, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to an electrode-composite separator assembly for a lithium battery, and a lithium battery including the same.

2. Description of the Related Art

Lithium batteries are high-performance batteries having a highest energy density among currently available secondary batteries, and are applicable in various fields such as electric vehicles.

A lithium battery may have a structure in which a separator is disposed between a cathode and an anode. A polyolefin-based separator may be used as the separator. However, the polyolefin-based separator has insufficient heat resistance and needs to be further improved for use in a lithium ion battery for electric vehicles.

With recent increasing demands for flexible batteries for use in flexible devices, the importance of structural stability of a battery against repeated deformation is growing. To ensure the structural stability of a battery, there is a need to improve the strength and characteristics of the separator.

SUMMARY

Provided is an electrode-composite separator assembly for a lithium battery.

Provided is a lithium battery with improved cell performance including the electrode-composite separator assembly.

Additional aspects will be set forth in part in the description which follows and, in part, will be apparent from the description, or may be learned by practice of the presented exemplary embodiments.

According to an embodiment, an electrode-composite separator assembly for a lithium battery includes: an electrode; and a composite separator, wherein the composite separator includes: a copolymer including a first repeating unit represented by Formula 1, a second repeating unit represented by Formula 2, and a third repeating unit represented by Formula 3; at least one selected from an inorganic particle and an organic-inorganic particle; and at least one polymer selected from a fluorinated polymer and a heat-resistant polymer; wherein Formulas 1 to 3 are

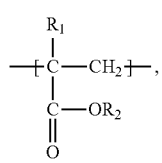

Formula 1 wherein, in Formula 1, $R_1$ is a hydrogen or a C1-C5 alkyl group, and $R_2$ is a C2-C20 alkyl group,

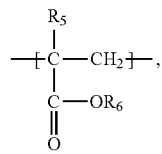

Formula 2 wherein in Formula 2, $R_5$ is a hydrogen or a C1-C5 alkyl group, and $R_6$ is a methyl group, and

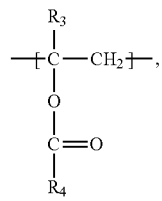

Formula 3 wherein in Formula 3, $R_3$ is a hydrogen or a C1-C5 alkyl group, and $R_4$ is a C1-C10 alkyl group.

According to an aspect of another exemplary embodiment, a lithium battery includes the electrode-composite separator assembly.

Also disclosed is a method of manufacturing an electrode-composite separator assembly for a lithium battery, the method including:
  combining a copolymer including a first repeating unit of Formula 1, a second repeating unit of Formula 2, and a third repeating unit of Formula 3,
    a fluorinated polymer,
    at least one selected from an inorganic particle and an organic-inorganic particle, and
    a solvent to form a composition;
  disposing the composition on an electrode; and
  removing the solvent to manufacture the electrode-composite separator assembly,
  wherein Formulas 1 to 3 are

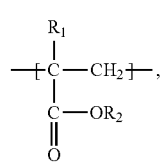

Formula 1 wherein, in Formula 1, $R_1$ is a hydrogen or a C1-O5 alkyl group, and $R_2$ is a C2-C20 alkyl group,

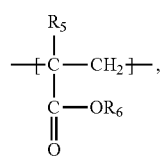

Formula 2 wherein in Formula 2, $R_5$ is a hydrogen or a C1-C5 alkyl group, and $R_6$ is a methyl group, and

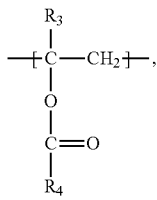

Formula 3 wherein in Formula 3, $R_3$ is a hydrogen or a C1-C5 alkyl group, and $R_4$ is a C1-C10 alkyl group.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
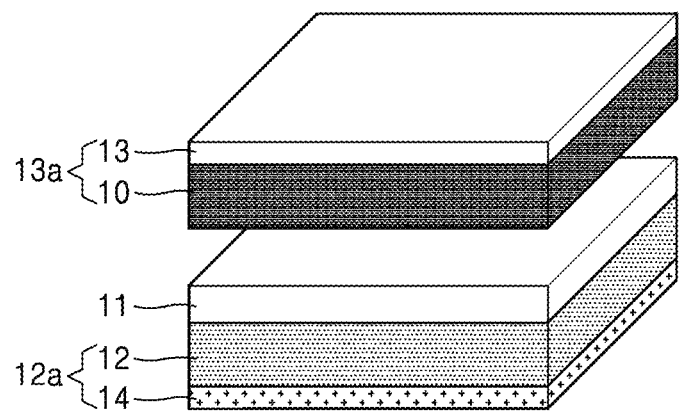
FIG. 1A is a schematic view illustrating a structure of a lithium battery according to an embodiment.

Reference will now be made in detail to exemplary embodiments of an electrode-composite separator assembly for a lithium battery, and a lithium battery including the same, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. "Or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an aspect of the present disclosure, an electrode-composite separator assembly for a lithium battery includes an electrode and a composite separator, wherein the composite separator includes a copolymer including a first repeating unit represented by Formula 1, a second repeating unit represented by Formula 2, and a third repeating unit represented by Formula 3, at least one selected from an inorganic particle and an organic-inorganic particle; and at least one polymer selected from a fluorinated polymer and a heat-resistant polymer; wherein Formulas 1 to 3 are

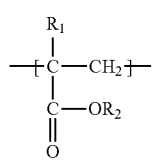

Formula 1 wherein in Formula 1, $R_1$ may be a hydrogen or a C1-C5 alkyl group; and $R_2$ may be a C2-C20 alkyl group,

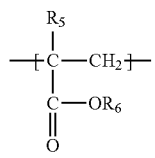

Formula 2 wherein in Formula 2, $R_5$ may be a hydrogen or a C1-C5 alkyl group; and $R_6$ may be a methyl group,

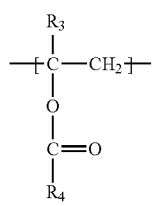

Formula 3 wherein in Formula 3, $R_3$ may be a hydrogen or a C1-C5 alkyl group, and $R_4$ may be a C1-C10 alkyl group.

A lithium battery may use a polyolefin-based membrane such as a polyethylene membrane as a separator. However, a polyolefin-based membrane may not be so good for wettability of a hydrophilic electrolyte due to its hydrophobic character and the polyolefin-based membrane may have poor heat resistance. To improve the wettability of electrolyte to the polyolefin-based membrane and the heat-resistance of the polyolefin-based membrane, a separator including a binder having improved heat-resistance was developed. However, the heat-resistance of this separator may be reduced when it is exposed under high-temperature conditions at 150° C. or greater. The separator including a highly heat-resistant binder may have improved air-permeability, and may include undesirably large pores due to difficulty in pore size control and consequentially reduce the safety of the lithium battery.

A lithium battery used in a flexible device may undergo repeated deformation, and the repeated deformation may cause misalignment of a separator in the battery. The misalignment of the separator may cause a cathode and an anode to contact one another resulting in an internal short circuit and an adverse event, and thus significantly reduce the safety of the lithium battery.

To improve these drawbacks, the present disclosure provides an electrode-composite separator assembly in which electrodes and a separator are integrated together, without using a polyolefin-based membrane. Using the electrode-composite separator assembly, a lithium battery with improved heat resistance, structural stability, and electrochemical characteristics may be manufactured. As used herein, the expression "integrated" is used to refer to a structure in which the electrodes and a composite separator are strongly bound to each other without an intermediate membrane therebetween.

Figure 1B:
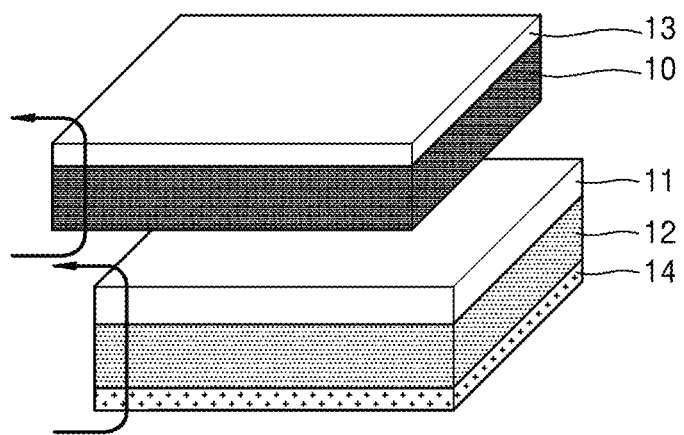
FIG. 1B illustrates the state of the lithium battery of the disclosure after bending.
Figure 1C:
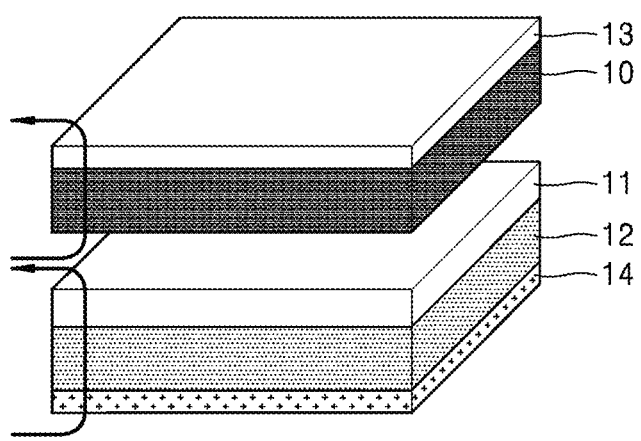
FIG. 1C illustrates the state of the lithium battery of the disclosure after heating.

FIG. 1A is a schematic view illustrating a structure of an electrode-composite separator assembly according to an embodiment, and a lithium battery including the electrode-composite separator assembly. FIG. 1B is a schematic view illustrating a structure of an electrode-composite separator assembly, and a lithium battery including the electrode-composite separator assembly after bending. FIG. 1C is a schematic view illustrating a structure of an electrode-composite separator assembly, and a lithium battery including the electrode-composite separator assembly after heating.

Referring to FIG. 1A, the lithium battery may have a structure including a cathode 13a, an anode 12a, and a composite separator 11 disposed between the cathode 13a and the anode 12a. The anode 12a may comprise an anode active material layer 12, which is disposed on an anode current collector 14. The cathode 13a may comprise a cathode active material layer 10, which is disposed on a cathode current collector 13.

The composite separator 11 may be disposed directly on the anode active material layer 12 as illustrated in FIG. 1A. However, the structure of the composite separator 11 is not limited thereto.

Figure 1D:
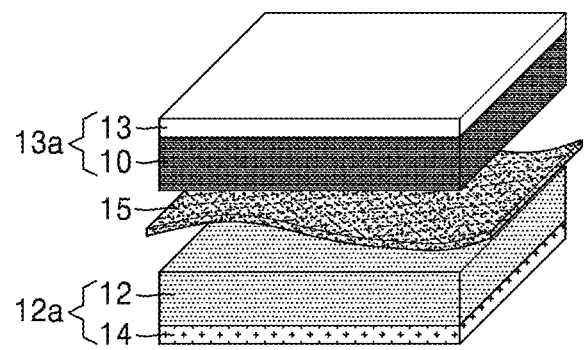
FIG. 1D illustrates the state of a lithium battery which does not include an electrode-composite separator assembly.
Figure 1E:
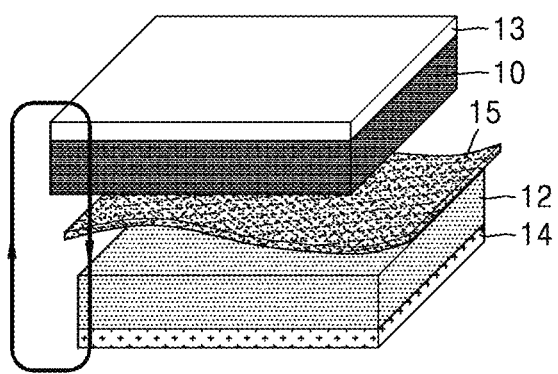
FIG. 1E illustrates the state of a lithium battery which does not include an electrode-composite separator assembly after bending.
Figure 1F:
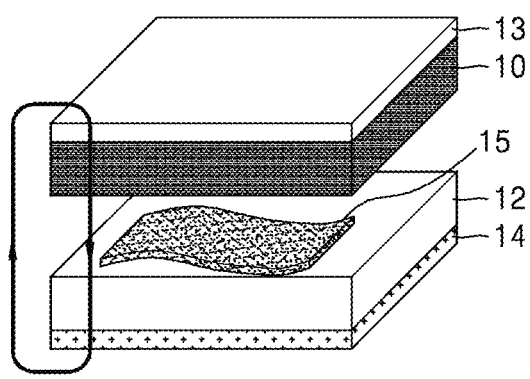
FIG. 1F illustrates the state of a lithium battery which does not include an electrode-composite separator assembly after heating.

FIG. 1D is a schematic view illustrating a structure of an electrode assembly comprising a polyolefin separator and a lithium battery including the polyolefin separator. The polyolefin separator may be a polyethylene/polypropylene (PE/PP) separator, and the polyolefin separator 15 may be disposed between a cathode 13a and an anode 12a. FIG. 1E illustrates deformation caused by bending the lithium battery using a polyolefin-based separator. FIG. 1F illustrates deformation caused by heating the lithium battery using a polyolefin-based separator.

As illustrated in FIG. 1D, when the polyolefin-based separator is used, misalignment of the cathode 13a and the anode 12a may occur due to bending (or twisting), so that the polyolefin-based separator 15, e.g., a PE/PP separator, may be dislocated, causing the anode 12a and the cathode 13a to contact each other and consequently causing an internal short. Furthermore, heating may cause the PE/PP separator 15 to shrink. The shrinkage of the polyethylene/polypropylene separator 15 may also lead to an internal short circuit due to contact between the anode 12a and the cathode 13a, and a risk of explosion by thermal runaway.

However, when a lithium battery including an electrode-composite separator assembly according to an embodiment as described above with reference to FIG. 1A is bent or heated, misalignment and dislocation of the electrode may not occur or be effectively eliminated, and thus an internal short circuit is prevented, as illustrated in FIG. 1B and FIG. 1C. Even when heated, the composite separator 11 may not be deformed or shrunk due to its improved heat resistance, so that an internal short circuit and thermal runaway may be prevented.

In some embodiments, the first repeating unit represented by Formula 1 in the copolymer of the composite separator may have low glass transition temperature, be insoluble in an electrolyte, and have improved stability against the electrolyte. The first repeating unit represented by Formula 1 may have a glass transition temperature of about 0° C. to about 80° C., about 10° C. to about 50° C., or about 15° C. to about 40° C.

The first repeating unit represented by Formula 1 may be at least one selected from an ethyl (meth)acrylate unit, a propyl (meth)acrylate unit, a butyl (meth)acrylate unit, a pentyl (meth)acrylate unit, a hexyl (meth)acrylate unit, and an octyl (meth)acrylate unit. As used herein, (meth)acrylate is inclusive of both acrylate and methacrylate.

The second repeating unit represented by Formula 2 may have improved polymerization stability to form a target copolymer through a polymerization reaction together with the first repeating unit represented by Formula 1 and the third repeating unit represented by Formula 3. For example, the second repeating unit represented by Formula 2 may be a methyl methacrylate unit or a methyl acrylate unit. For example, the second repeating unit represented by Formula 2 may have a glass transition temperature of about 60° C. to about 140° C., about 80° C. to about 120° C., or about 90° C. to about 110° C. The amount of the second repeating unit represented by Formula 2 may be about 0.1 mole to about 1.5 moles, and in some embodiments, about 0.15 mole to about 0.5 mole, and in some other embodiments, about 0.2 moles to about 0.25 moles, based on 1 mole of the first repeating unit represented by Formula 1. When the amount of the second repeating unit represented by Formula 2 is within any of these ranges, the copolymer including the second repeating unit may have a higher glass transition temperature and improved stability, and may provide the composite separator with improved mechanical characteristics and heat resistance.

The third repeating unit represented by Formula 3 may have a lower glass transition temperature and may have improved affinity for an electrolyte and may be more easily being dissolved in the electrolyte. Using a copolymer including the third repeating unit of Formula 3, the composite separator may have improved adhesion to the electrode.

For example, the third repeating unit represented by Formula 3 may have a glass transition temperature of about 0° C. to about 60° C., about 10° C. to about 50° C., or about 15° C. to about 40° C.

For example, the third repeating unit represented by Formula 3 may be vinyl acetate. The amount of the third repeating unit represented by Formula 3 may be about 0.1 mole to about 3.5 moles, and in some embodiments, about 0.5 moles to about 1.5 moles, and in some other embodiments, about 0.8 moles to about 1.25 moles, based on 1 mole of the first repeating unit represented by Formula 1. When the amount of the third repeating unit represented by Formula 3 is within any of these ranges, the composite separator may have improved wettability to electrolyte.

The copolymer including the first repeating unit of Formula 1, the second repeating unit of Formula 2, and the third repeating unit of Formula 3 may provide improved affinity to an electrolyte and improved thermal stability. In some embodiments, the copolymer of the composite separator may have improved wettability to the electrolyte and improved lithium ionic conductivity, compared to a fluorinated polymer such as polyvinylidene fluoride (PVDF), and thus may provide improved lithium ion conductivity across the composite separator.

For example, the copolymer of the composite separator may be a block copolymer, a graft copolymer, a random copolymer, or an alternating copolymer. For example, the copolymer of the composite separator may be a block copolymer. Using a block copolymer, the composite separator may have improved electrochemical and mechanical characteristics.

The copolymer of the composite separator may have a weight average molecular weight of about 300,000 Daltons to about 1,200,000 Daltons, about 400,000 Daltons to about 1,000,000 Daltons, or about 500,000 Daltons to about 700,000 Daltons. When the copolymer of the composite separator has a weight average molecular weight within any of these ranges, the composite separator may have improved mechanical characteristics, e.g., greater modulus, and improved thermal stability.

In some embodiments, the copolymer of the composite separator may be a copolymer represented by Formula 4a or 4b.

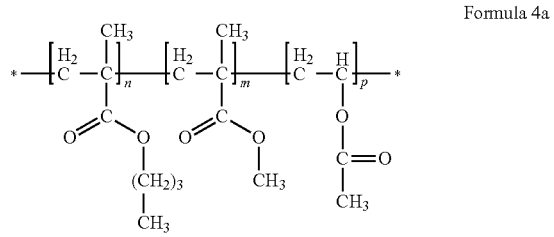

Formula 4a

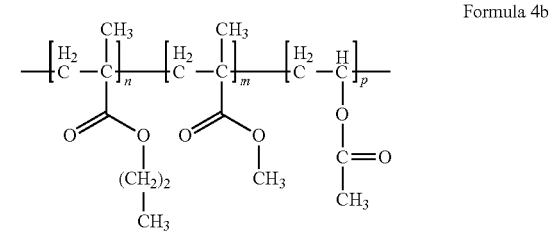

Formula 4b

In Formulas 4a and 4b, n, m, and p are mole fractions of the first to third repeating units, respectively, and may be each independently about 0.01 to about 0.99, wherein the sum of n, m. and p may be 1.

In some embodiments, n may be about 0.2 to about 0.8, for example, 0.4; m may be about 0.1 to about 0.5, for example, about 0.1; and p may be about 0.1 to about 0.7, for example, about 0.5.

The copolymer represented by Formula 4a or 4b may have a viscosity of about 200 centipoise (cP) to about 1,200 cP, about 300 cP to about 1,000 cP, or about 400 cP to about 800 cP at 25° C., when measured as a 10 weight percent (wt %) solution thereof in acetone. The copolymer represented by Formula 4a (wherein n is 0.4, m is 0.1, and p is 0.5) may have a glass transition temperature of about 36° C. to about 38° C.

In some embodiments, the composite separator may include, in addition to the copolymer, at least one selected from an inorganic particle and organic-inorganic particle, and at least one polymer selected from a fluorinated polymer and a heat-resistant polymer.

For example, the at least one selected from an inorganic particle and an organic-inorganic particle may be at least one selected from $Al_2O_3$, $SiO_2$, $B_2O_3$, $Ga_2O_3$, $TiO_2$, $SnO_2$, $BaTiO_3$, $Pb(Zr_aTi_{1-a})O_3$ wherein $0 \le a \le 1$, $Pb_{1-x}La_xZr_yO_3$ wherein $0<x<1$, and $0<y<1$, $Pb(Mg_3Nb_{2/3})_3$, $PbTiO_3$, $HfO_2$, $SrTiO_3$, $CeO_2$, $MgO$, $NiO$, $CaO$, $ZnO$, $Y_2O_3$, $TiO_2$, $SiC$, $ZrO_2$, a borosilicate, $BaSO_4$, a nanoclay, fumed silica, fumed alumina, graphite oxide, graphene oxide, and a metal-organic framework.

The metal-organic framework (MOF) may be in the form of organic-inorganic particles and may be a porous crystalline compound in which a Group 2 to Group 15 metal ion, which may be in the form of a cluster of Group 2 to Group 15 metal ions, is chemically bonded with an organic ligand. The organic ligand refers to an organic group that may form an organic bond such as coordinate bond, ionic bond, or covalent bond with the metal ion. For example, an organic group having at least two binding sites for such metal ions as described above may form a stable structure through binding with the metal ions.

The Group 2 to Group 5 metal ion may be at least one selected from cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), and bismuth (Bi). The organic ligand may be a group derived from at least one compound selected from an aromatic dicarboxylic acid, an aromatic tricarboxylic acid, an imidazole, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, and a compound having at least one functional group selected from an amino group, an imino group, an amide group, a dithio carboxylic acid group ($—CS_2H$), a dithio carboxylate group ($—CS_2^-$), a pyridine group, and a pyrazine group.

Non-limiting examples of the aromatic dicarboxylic acid and the aromatic tricarboxylic acid are benzene dicarboxylic acid, benzene tricarboxylic acid, biphenyl dicarboxylic acid, and terphenyl-dicarboxylic acid.

For example, the organic ligand may be a group including at least one structure selected from those represented by Formula 5.

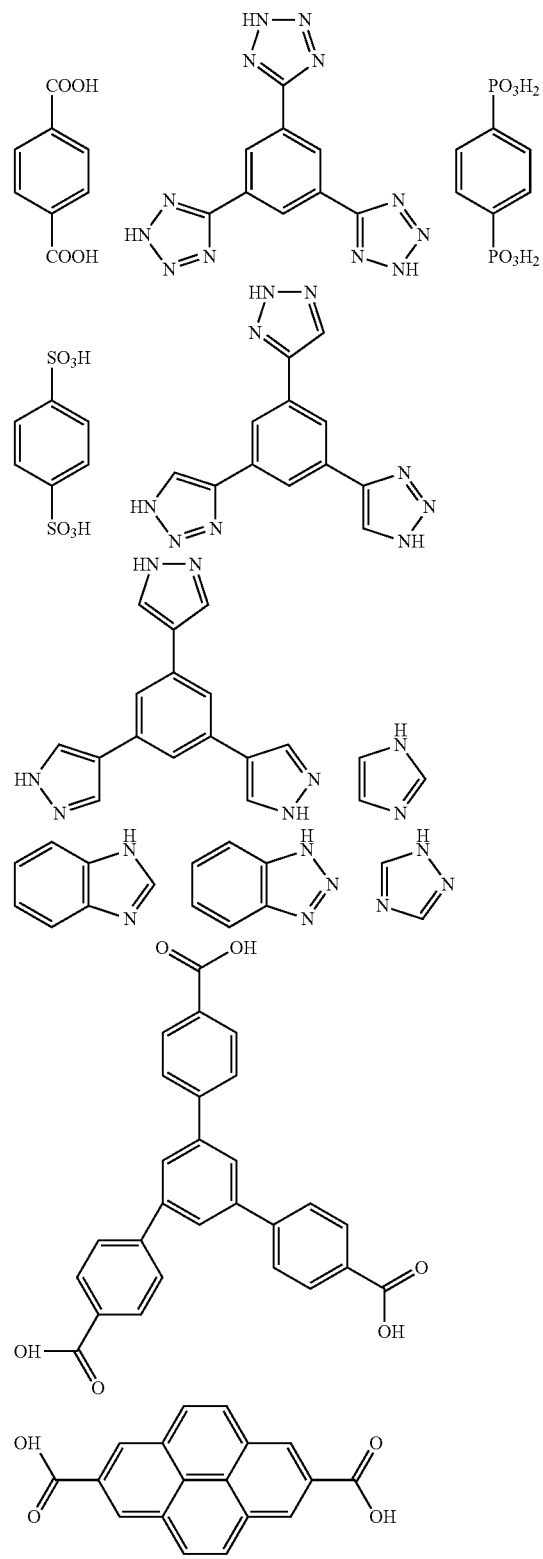

Formula 5

The metal-organic framework (MOF) may be, for example, at least one selected from $Ti_8O_8(OH)_4[O_2C-C_6H_4-CO_2]_6$, $Cu(bpy)(H_2O)_2(BF_4)_2(bpy)$ wherein bpy is 4,4'-bipyridine, $Zn_4O(O_2C-C_6H_4-CO_2)_3$ (Zn-terephthalic acid-MOF, Zn-MOF), and $Al(OH)(O_2C-C_6H_4-CO_2)$.

For example, the cage-structured silsesquioxane may be a polyhedral oligomeric silsesquioxane (POSS). The number of silicon atoms in the POSS may be about 8 or less, for example, 6 or 8. For example, the cage-structured silsesquioxane may be a compound represented by Formula 6.

$Si_kO_{1.5k}(R^1)_a(R^2)_b(R^3)_c$  Formula 6

In Formula 6, $R^1$, $R^2$, and $R^3$ may each independently be a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In Formula 6, $0<a<20$, $0<b<20$, $0<c<20$, and $k=a+b+c$, provided that a, b, and c are selected in such a way that $6 \le k \le 20$.

The cage-structured silsesquioxane may be at least one selected from a compound represented by Formula 7 and a compound represented by Formula 8.

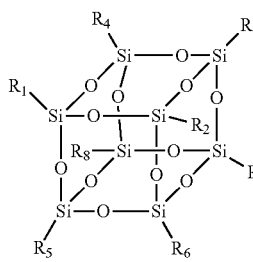

Formula 7

In Formula 7, $R_1$ to $R_8$ may each independently be a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

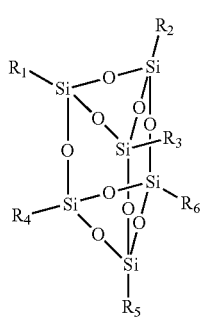

Formula 8

In Formula 8, $R_1$ to $R_6$ may each independently be a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In some embodiments, $R_1$ to $R_8$ in Formula 7 and $R_1$ to $R_6$ in Formula 8 may be an isobutyl group. For example, the cage-structured silsesquioxane may be octaisobutyl-t8-silsesquioxane.

In some embodiments, the inorganic particle of the composite separator may be $Al_2O_3$, which is not reactive with lithium.

The at least one selected from an inorganic particle and an organic-inorganic particle may have an average particle diameter of about 1 μm or less, and in some embodiments, about 500 nm or less, and in some other embodiments, about 100 nm or less. For example, the at least one selected from an inorganic particle and an organic-inorganic particle may have a particle diameter of about 1 nm to about 1000 nm, about 1 nm to about 100 nm, and in some embodiments, about 10 nm to about 100 nm, and in some other embodiments, about 30 nm to about 70 nm. When the at least one selected from an inorganic particle and an organic-inorganic particle has a particle diameter within any of these ranges, the composite separator may have suitable film formability and mechanical properties without deterioration in ionic conductivity.

The heat-resistant polymer of the composite separator may be a polymer with high thermal stability, for example, at least one selected from an aromatic polyester, polyimide, polyethersulfone (PES), polyvinylidene fluoride, polyamide, poly(meta-phenylene isophthalamide), polysulfone (PSU), polyetherketone, polyethylene terephthalate, polytrimethylene terephthalate, polyethylene naphthalate, polyphosphazene (e.g., poly(diphenoxy phosphazene or poly{bis[2-(2-methoxyethoxy)phosphazene]}), polyurethane copolymer, polyurethane, polyether urethane, cellulose acetate, cellulose acetate butyrate, cellulose acetate propionate, polyestersulfone, polyetherimide (PEI), polycarbonate, polyphenylene sulfide (PPS), polyacrylate, and polytetrafluoroethylene.

The fluorinated polymer of the composite separator may be at least one selected from polyvinylidene fluoride, a vinylidene fluoride-hexafluoropropylene copolymer, a vinylidene fluoride-trichloroethylene copolymer, and a vinylidene fluoride-chlorotrifluoroethylene copolymer.

The fluorinated polymer may include, for example, a high-viscosity high-molecular weight fluorinated polymer and a high-elasticity low-viscosity fluorinated polymer. The high-viscosity high-molecular weight fluorinated polymer refers to a fluorinated polymer having a viscosity of about 3,000 to about 5,000 cP (when determined in N-methyl pyrrolidone (NMP) in an amount of 2 to 5 wt %) and a weight average molecular weight of about 1,000,000 to about 1,200,000 Daltons (Da), and may be, for example, PVDF 5130 (Solef 5130, available from Solvay America, Inc.). The high-elasticity low-viscosity fluorinated polymer refers to a polymer having a viscosity of about 2,000 to about 4,000 cP (when determined in acetone in an amount of 2 to 5 wt %) and a tensile modulus (Young's modulus) of about 1,300 to about 2,000 megaPascals (MPa), and may be, for example, PVDF 6020 (Solef 6020, available from Solvay America, Inc.). Here, the tensile modulus may determined according to ASTM D882.

The amount of the high-viscosity high-molecular weight fluorinated polymer may be from about 20 to about 80 parts by weight, about 30 to about 70 parts by weight, or about 40 to about 60 parts by weight, based on 100 parts by weight of a total weight of the fluorinated polymer. When the amount of the high-viscosity high-molecular weight fluorinated polymer is within this range, the composite separator may have improved mechanical adhesion characteristics The amount of the at least one of an inorganic particle and an organic-inorganic particle may be from about 500 parts to about 5,000 parts by weight, and in some embodiments, about 1,000 parts to about 3,000 parts by weight, or about 1,500 to about 2,500 parts by weight, based on 100 parts by weight of the total weight of the copolymer and the at least one selected from a fluorinated polymer and a heat-resistant polymer. When the amount of the at least one of an inorganic particle and an organic-inorganic particle is within any of these ranges, the composite separator may have improved flexibility without breakage.

A weight ratio of the copolymer to the at least one selected from a fluorinated polymer and a heat-resistant polymer may be from about 1:9 to about 9:1, or from about 1:6 to about 6:1, or from about 1:2 to about 2:1, and in some embodiments, about 7:3. When the weight ratio is within any of these ranges, a lithium battery including the composite separator may have improved capacity characteristics.

The composite separator may have a thickness of about 5 micrometers (μm) to about 60 μm, about 10 μm to about 45 μm, or about 15 μm to about 30 μm. When the thickness of the composite separator is within any of these ranges, a lithium battery including the composite separator may have improved electrochemical characteristics without reduction in safety.

In some embodiments, the composite separator of the electrode-composite separator assembly may include $Al_2O_3$, a copolymer represented by Formula 4a, and polyvinylidene fluoride.

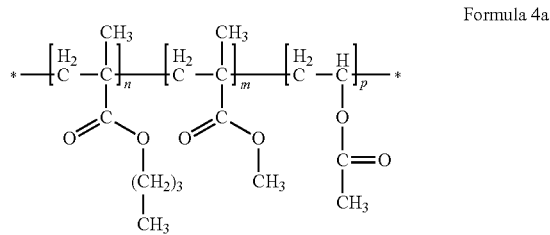

Formula 4a

In Formula 4a, n, m, and p, which indicate mole fractions of the first, second, and third repeating units, respectively, may each independently be about 0.01 to about 0.99, about 0.05 to about 0.9, or about 0.1 to about 0.5, and may be about 1 in total. For example, n may be 0.4, m may be 0.1, and p may be 0.5.

In some embodiments, the electrode-composite separator assembly may have improved thermal stability. For example, the electrode-composite separator assembly may have a thermal shrinkage ratio of less than about 1% both in vertical and horizontal directions after storage at 150° C. for 1 hour. When the electrode-composite separator assembly having such thermal shrinkage characteristics is exposed to heat at about 150° C. or more, the composite separator including inorganic particles (for example, $Al_2O_3$) with suitable heat resistance may have a reduced likelihood of undergoing thermal shrinkage, and thus have a lower risk of internal short circuit between the electrodes. In addition, the electrode-composite separator assembly may have ensured structural stability even after repeated bending or deformation since misalignment of the anode and the cathode to the composite separator does not occur to cause direct contact between the anode and the cathode.

In some embodiments, the composite separator of the electrode-composite separator assembly may have a porosity of about 30% to about 70%, about 40% to about 60%, or about 45% to about 55%. When the composite separator has a porosity within this range, mobility of lithium ions across the composite separator may be improved.

In some embodiments, the electrode-composite separator assembly may be manufactured by integrating a composite separator including i) the copolymer including a first repeating unit of Formula 1, a second repeating unit of Formula 2, and a third repeating unit of Formula 3, ii) the fluorinated polymer, and iii) the at least one selected from an inorganic particle and an organic-inorganic particle with at least one selected from a cathode and an anode. The integrating of the composite separator with the at least one selected from cathode and anode may include directly coating a composite separator composition on the electrode and drying the resulting structure to form the composite separator.

In other embodiments, the integrating of the composite separator with the at least one selected from the cathode and the anode may include coating a composite separator composition on a substrate and drying the resulting structure to form the composite separator, then detaching the composite separator from the substrate, and disposing it between the cathode and anode, thereby manufacturing a target electrode-composite separator assembly.

For example, the composite separator composition may be coated on the anode. An anode may have a larger area than a cathode. Therefore, the composite separator may be prepared to have an equal or larger size than that of the anode.

The composite separator may have improved affinity to the electrolyte, provide improved electrolyte impregnating ability, improved electrolyte leakage preventing ability, and improved lithium ion conductivity.

In some embodiments, the electrode-composite separator assembly may further include an additional separator. The additional separator may be disposed on the composite separator. This additional separator may be any suitable separator for a lithium battery. For example, the separator may be a polyolefin-based porous membrane or a non-woven fabric, but is not limited thereto. For example, the polyolefin-based porous membrane may be a polymer membrane including at least one selected from a polyolefin polymer, for example, a polyethylene such as a high-density polyethylene, a low-density polyethylene, a linear low-density polyethylene, a ultra-high molecular weight polyethylene, a polypropylene, a polybutylene, and a polypentene. The non-woven fabric may be a polyolefin non-woven fabric, or a non-woven fabric including a polymer, for example, at least one selected from polyethylene terephthalate, polybutylene terephthalate, polyester, polyacetal, polyamide, polycarbonate, polyimide, polyetherether ketone, polyethersulfone, polyphenylene oxide, polyphenylene sulfide, and polyethylene naphthalene. A combination comprising at least two of the foregoing may be used.

For example, the non-woven fabric may be a spun-bond non-woven fabric or a meltblown non-woven fabric comprising long fibers, e.g., fibers having a length of about 1 μm to 1 meter, or about 100 μm to about 10 centimeter (cm). The separator may have any suitable thickness, and may have a thickness of, for example, about 1 μm to about 100 μm, about 5 μm to about 50 μm, or about 10 μm to about 40 μm. The separator may have any suitable pore size, and may have a pore size of, for example, about 1 nm to about 500 nm, about 1 nm to about 200 nm, or about 1 nm to about 100 nm, and any suitable porosity, for example a porosity of 5% to about 99%, 10% to about 95%, or 20% to about 80%.

In some embodiments, the composite separator of the electrode-composite separator assembly may further include a binder, which may be used in manufacturing a cathode and/or an anode. For example, the binder may be at least one selected from styrene butadiene rubber, carboxymethyl cellulose (CMC), polyvinyl alcohol, starch, hydroxypropyl cellulose, reproduced cellulose, polyvinylpyrrolidone, polytetrafluoroethylene, polyethylene, polypropylene, ethylene propylene diene terpolymer (EPDM), sulfonated EPDM, and fluorocarbon rubber. The amount of the binder may be in a range of about 0.1 part to about 300 parts by weight, 0.5 part to about 100 parts by weight, or 1 part to about 50 parts by weight, based on 100 parts by weight of a total weight of the copolymer and the at least one of a fluorinated polymer and a heat-resistant polymer.

Hereinafter, a method of manufacturing an electrode-composite separator assembly according to an embodiment is further disclosed.

First, at least one of an inorganic particle and an organic-inorganic particle, a fluorinated polymer, and a copolymer including a first repeating unit represented by Formula 1, a second repeating unit represented by Formula 2, and a third repeating unit represented by Formula 3 are mixed with a solvent to obtain a composite separator composition.

Next, the composite separator may be coated on an electrode and then dried to form the electrode-composite separator assembly.

For example, the coating of the composite separator composition may be performed using spin coating, roll coating, curtain coating, extrusion, screen printing, inkjet printing, a doctor blade, or the like.

The drying may be performed at a temperature of about 25° C. to about 130° C. The drying may be performed under vacuum conditions.

The solvent may be any suitable organic solvent available in the art. For example, the organic solvent may be at least one selected from tetrahydrofuran, N-methylpyrrolidone, acetonitrile, benzonitrile, 2-methyl tetrahydrofuran, γ-butyrolactone, dioxolane, N, N-dimethylformamide, N, N-dimethyl acetamide, dimethyl sulfoxide, dioxane, 1,2-dimethoxyethane, 1,2-diethoxyethane, sulfolane, dichloroethane, chlorobenzene, nitrobenzene, diethyleneglycol, and dimethyl ether. The amount of the solvent may be about 50 parts to about 10,000 parts by weight, about 100 parts to about 5,000 parts by weight, or about 300 parts to about 3,000 parts by weight, based on 100 parts by weight of a total weight of the at least one selected from an inorganic particle and an organic-inorganic particle, the at least one polymer selected from a fluorinated polymer and a heat-resistant polymer, and the copolymer.

The composite separator composition may be prepared by mixing all the ingredients at the same time. In some other embodiments, the composite separator composition may be prepared by mixing the at least one selected from an inorganic particle and an organic-inorganic particle with a solvent and a dispersing agent to obtain a dispersion of the at least one selected from an inorganic particle and an organic-inorganic particle, and mixing the dispersion with a fluorinated polymer and a copolymer as described above. The fluorinated polymer and the copolymer may be each separately dispersed or dissolved in a solvent to prepare a dispersion or solution thereof. These separate mixing processes may facilitate dispersing and mixing the ingredients in the composite separator composition.

The dispersion of the at least one selected from an inorganic particle and an organic-inorganic particle may be prepared by milling. The milling may provide improved control of the average particle diameter of the inorganic particle and the organic-inorganic particle and provide an average particle diameter of about 0.5 μm or less, e.g., about 0.001 μm to about 0.2 μm, about 0.005 μm to about 0.1 μm, or about 0.05 μm to about 0.1 μm so that the composite separator composition may have a uniform composition. Using the composite separator composition having uniform composition, the composite separator may have improved mechanical characteristics.

If desired a dispersing agent may be used, and the dispersing agent may be a compound or polymer including a polar group, such as a carboxyl group, or a hydroxyl group. Non-limiting examples of the dispersing agent may be an acid-containing compound such as a phosphoric acid ester; an acid group-containing copolymerization product; a hydroxyl group-containing polycarboxylic acid ester, polysiloxane, a salt of a long-chain polyaminoamide, and an acid ester. Any suitable dispersing agent may be used. For example, the dispersing agent may be at least one selected from Triton X-100, acetic acid, cetyltrimethyl ammonium bromide (CTAB), isopropyltris(N-aminoethylaminoethyl)titanate (INAAT, available from Ajimoto Fine-Techno Co. Inc.), 3-aminopropyltriethoxy-silane (APTS, available from Aldrich), polyvinyl pyrrolidone (PVP), or poly(4-vinylphenol). The amount of the dispersing agent may be from about 0.01 part to about 10 parts by weigh t, based on 100 parts by weight of a total weight of the at least one selected from an inorganic particle and an organic-inorganic particle.

According to another aspect of the present disclosure, a lithium battery includes the electrode-composite separator assembly.

The electrode of the electrode-composite separator assembly may be an anode.

In some embodiments, the lithium battery may further include a solid electrolyte including at least one selected from an inorganic particle and an organic-inorganic particle, and a lithium ionic conductor. When the electrode of the electrode-composite separator assembly is an anode, the solid electrolyte may be between the composite separator and a cathode.

The lithium ionic conductor may be at least one selected from $Li_3N$, a lithium super ionic conductor, $Li_{3y}PO_{4-x}N_x$ wherein $0<y<3$ and $0<x<4$, $Li_{3.25}Ge_{0.25}P_{0.75}S_4$, $Li_2S$, $Li_2S$—$P_2S_5$, $Li_2S$—$SiS_2$, $Li_2S$—$GeS_2$, $Li_2S$—$B_2S_5$, $Li_2S$—$Al_2S_5$, $Li_2O$—$Al_2O_3$—$TiO_2$—$P_2O_5$, lithium lanthanum titanate $Li_{0.34}La_{0.51}TiO_{2.94}$, lithium titanium aluminum phosphate, and $Li_{1+x}Ti_{2-x}Al(PO_4)_3$ wherein $0 \leq x \leq 0.4$.

In some embodiments, the lithium battery may further include a liquid electrolyte. In the electrode-composite separator assembly of the lithium battery, the copolymer of the composite separator may be insoluble in the liquid electrolyte. "Insoluble" in the liquid electrolyte means that the maximum solubility of the copolymer in the liquid electrolyte is less than 5 wt %, less than 1 wt %, less than 0.1 wt %, or less than 0.01 wt %, based on the total weight of the liquid electrolyte. An embodiment in which a solubility of the copolymer in the liquid electrolyte is less than 1 wt % is mentioned.

In some embodiments, the lithium battery may include a gel electrolyte, and if desired the gel electrolyte may be provided instead of the solid electrolyte. In some other embodiments, the lithium battery may include both a solid electrolyte and a gel electrolyte.

The gel electrolyte may be any suitable electrolyte in gel form. For example, the gel electrolyte may include a polymer and a polymer ionic liquid. For example, the polymer may be a solid graft (block) copolymer electrolyte.

The solid electrolyte may be, for example, an organic solid electrolyte or an inorganic solid electrolyte. Non-limiting examples of the organic solid electrolyte include those comprising polyethylene, a polyethylene derivative, polyethylene oxide, a polyethylene oxide derivative, polypropylene oxide, a polypropylene oxide derivative, a phosphoric acid ester polymer, polyester sulfide, polyvinyl alcohol, polyvinylidene fluoride, and polymers including ionic dissociative groups. A combination comprising at least two of the foregoing may be used.

Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2$, $Ga_2S_3$, $Li_2O.11Al_2O_3$, $(Na,Li)_{1+x}Ti_{2-x}Al_x(PO_4)_3$ wherein $0.1 \times 0.9$, $Li_{1+x}Hf_{2-x}Al_x(PO_4)_3$ wherein $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ wherein M is a rare earth element, such as Nd, Gd, Dy, or the like, $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ wherein $x \leq 0.8$, $0 \leq y \leq 1.0$, and M is Nd, Sm, Eu, Gd, Tb, Dy, Ho, Er, Tm, or Yb, $Li_{1+x+y}Q_xTi_{2-x}Si_yP_{3-y}O_{12}$ wherein $0 < x \leq 0.4$, $0 < y \leq 0.6$, and Q is Al or Ga, $Li_6Ba\ La_2Ta_2O_{12}$, $Li_7La_3Zr_2O_{12}$, $Li_5La_3Nb_2O_{12}$, $Li_5La_3M_2O_{12}$ wherein M is Nb or Ta, and $Li_{7+x}A_xLa_{3-x}Zr_2O_{12}$ where $0 < x < 3$, and A is Zn.

In some embodiments, the cathode of the lithium battery may be a porous cathode. The porous cathode may be a cathode including pores, or any cathode that allows permeation of liquid electrolyte thereinto by capillary action.

For example, the porous cathode may be a cathode that may be obtained by coating a cathode active material composition including a cathode active material, a conducting agent, a binder, and a solvent, and drying the resulting structure. The resulting cathode may include pores among particles of the cathode active material. The porous cathode may be impregnated with liquid electrolyte.

In some embodiments, the cathode may further include a liquid electrolyte, a gel electrolyte, a solid electrolyte, or the like. The liquid electrolyte, the gel electrolyte, and the solid electrolyte may be any suitable electrolyte available for lithium batteries that does not react with the cathode active material, and thus prevent deterioration of the cathode active material during charging and discharging.

Hereinafter, embodiments of a method of manufacturing a lithium battery according to any of the above-described embodiments will be further disclosed.

A cathode active material for the cathode may include at least one selected from lithium cobalt oxide, lithium nickel cobalt manganese oxide, lithium nickel cobalt aluminum oxide, lithium iron phosphate, and lithium manganese oxide, but is not limited thereto. Any suitable cathode active material may be used.

For example, the cathode active material may comprise at least one compound selected from compounds represented by the following formulas: $Li_aA_{1-b}B'_bD_2$ wherein $0.90 \leq a \leq 1.8$ and $0 \leq b \leq 0.5$; $Li_aE_{1-b}B'_bO_{2-c}D_c$ wherein $0.90 \leq a \leq 1.8$, $0 \leq b \leq 0.5$, and $0 \leq c \leq 0.05$; $Li\ E_{2-b}B'_bO_{4-c}D_c$ wherein $0 \leq b \leq 0.5$, and $0 \leq c \leq 0.05$; $Li_aNi_{1-b-c}Co_bB'_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Co_bB'_cO_{2-\alpha}F'_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Mn_bB'_cD_\alpha$ wherein $0.90 \leq a \leq 1.8$, $0 \leq c \leq 0.05$, and $0 < \alpha \leq 2$; $Li_aNi_{1-b-c}Mn_bB'_cO_{2-a}F_a$ wherein $0.90 \leq a \leq 1.8$, $0 \leq c \leq 0.05$, and $0 < \alpha < 2$; $Li_aNi_bE_cG_dO_2$ wherein $0.90 \leq a \leq 1.8$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$, and $0.001 \leq b \leq 0.1$; $Li_aCoG_bO_2$ wherein $0.90 \leq a \leq 1.8$ and $0.001 \leq b \leq 0.1$; $Li_aMnG_bO_2$ wherein $0.90 \leq a \leq 1.8$ and $0.001 \leq b \leq 0.1$; $Li_aMn_2G_bO_4$ wherein $0.90 \leq a \leq 1.8$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ wherein $0 \leq f \leq 2$; $Li_{(3-f)}Fe_2(PO_4)_3$ wherein $0 \leq f \leq 2$; and $LiFePO_4$.

In the formulas above, A is at least one selected from nickel (Ni), cobalt (Co), and manganese (Mn); B' is at least one selected from aluminum (Al), nickel (Ni), cobalt (Co), manganese (Mn), chromium (Cr), iron (Fe), magnesium (Mg), strontium (Sr), vanadium (V), and a rare earth element; D is at least one selected from oxygen (O), fluorine (F), sulfur (S), and phosphorus (P); E is at least one selected from cobalt (Co), and manganese (Mn); F' is at least one selected from fluorine (F), sulfur (S), and phosphorus (P); G is at least one selected from aluminum (Al), chromium (Cr), manganese (Mn), iron (Fe), magnesium (Mg), lanthanum (La), cerium (Ce), strontium (Sr), and vanadium (V); Q is at least one selected from titanium (Ti), molybdenum (Mo), and manganese (Mn); I' is at least one selected from chromium (Cr), vanadium (V), iron (Fe), scandium (Sc), and yttrium (Y); and J is at least one selected from vanadium (V), chromium (Cr), manganese (Mn), cobalt (Co), nickel (Ni), and copper (Cu).

For example, the cathode active material may be at least one compound represented by Formula 9, Formula 10, and Formula 11.

$$Li_aNi_bCo_cMn_dO_2 \qquad \text{Formula 9}$$

In Formula 9, $0.90 \leq a \leq 1.8$, $0 \leq c \leq 0.5$, and $0 \leq d \leq 0.5$.

$$Li_2MnO_3 \qquad \text{Formula 10}$$

$$LiMO_2 \qquad \text{Formula 11}$$

In Formula 11, M may be Mn, Fe, Co, or Ni.

The cathode of the lithium battery may be manufactured as follows.

A cathode active material, a binder, and a solvent are mixed to prepare a cathode active material layer composition. A conducting agent may be further added into the cathode active material layer composition. The cathode active material layer composition is directly coated on a metallic current collector and dried to prepare a cathode. Alternatively, the cathode active material layer composition may be cast on a separate support to form a cathode active material film, which may then be separated from the support and then laminated on a metallic current collector to prepare a cathode plate.

The binder is a composition that contributes binding with an active material and a conductive material and binding with a current collector, and an amount of the binder added may be from about 1 part to about 100 parts by weight, about 1 part to about 50 parts by weight, or about 1 part to about 30 parts by weight based on 100 parts by weight of the total weight of the cathode active material. Non-limiting examples of the binder include at least one selected from polyvinylidene fluoride (PVDF), polyvinyl alcohol, carboxymethylcellulose (CMC), starch, hydroxypropylcellulose, cellulose, polyvinylpyrrolidone, polytetrafluoroethylene, polyethylene, polypropylene, ethylene-propylene-diene terpolymer (EPDM), sulfonated EPDM, styrene butadiene rubber, and a fluorinated rubber. The copolymer of the foregoing may be used. The amount of the binder may be about 1 part to about 20 parts by weight, about 2 parts to about 5 parts by weight, or about 2 parts to about 3 parts by weight, based on 100 parts by weight of the total weight of the cathode active material. When the amount of the binder is within this range, a binding force of the active material layer to the current collector may be satisfactory.

The conducting agent may be any suitable material, e.g., a material that does not cause an adverse chemical change in the lithium battery and provides suitable conductivity. Non-limiting examples of the conducting agent include graphite, such as natural graphite or artificial graphite; a carbonaceous material such as carbon black, acetylene black, Ketjen black, channel black, furnace black, lamp black, or summer black; a conductive fiber, such as carbon fiber or metal fiber; carbon fluoride; a metal powder, such as aluminum or nickel powder; a conductive whisker, such as zinc oxide or potassium titanate; a conductive metal oxide, such as a titanium oxide; and a conductive polymer, such as a polyphenylene derivative. A combination comprising at least two of the foregoing may be used.

The amount of the conducting agent may be from about 1 part to about 10 parts by weight, from about 2 parts to about 5 parts by weight, or about 2 parts to about 3 parts by weight, based on 100 parts by weight of the total weight of the cathode active material. When the amount of the conducting agent is within any of these ranges, the final cathode may have good conductivity characteristics.

A non-limiting example of the solvent is N-methylpyrrolidone.

The amount of the solvent may be from about 50 parts to about 5,000 parts by weight, about 100 parts to about 2,000 parts by weight, or about 200 parts to about 1,000 parts by weight, based on 100 parts by weight of the cathode active material. When the amount of the solvent is within this range, a process for forming the active material layer may be easily carried out.

The anode of the lithium battery may be manufactured in a substantially same manner as in the manufacture of the cathode, except for using an anode active material instead of the cathode active material.

The anode active material may comprise at least one selected from a carbonaceous material, silicon, a silicon oxide, a silicon-based alloy, a silicon-carbonaceous material composite, tin, a tin-based alloy, a tin-carbon composite, and a metal oxide. The carbonaceous material may comprise a crystalline carbon or an amorphous carbon. The crystalline carbon may be graphite, such as a natural graphite or an artificial graphite, and the graphite may be in at least one selected from a plate, flake, spherical, and fibrous form. The amorphous carbon may be soft carbon (carbon sintered at low temperatures), hard carbon, meso-phase pitch carbonization product, sintered coke, graphene, carbon black, fullerene soot, carbon nanotubes, and carbon fiber. Any appropriate anode active material may be used.

The anode active material may be at least one selected from Si, $SiO_x$ where $0<x<2$, for example, $0.5<x<1.5$, Sn, $SnO_2$, and a silicon-containing metal alloy. A metal that is alloyable with silicon may be at least one selected from Al, Sn, Ag, Fe, Bi, Mg, Zn, In, Ge, Pb, and Ti.

The anode active material may include a metal and/or metalloid that is alloyable with lithium, an alloy thereof, or an oxide thereof. Examples of the metal and/or metalloid alloyable with lithium, the alloy thereof, or the oxide thereof are at least one selected from Si, Sn, Al, Ge, Pb, Bi, Sb, a Si—Y' alloy where Y' is an alkali metal, an alkaline earth metal, a Group 13-16 element, a transition metal, and a rare earth element, except for Si, a Sn—Y" alloy where Y" is at least one selected from an alkali metal, an alkaline earth metal, a Group 13-16 element, a transition metal, and a rare earth element except for Sn, and $MnO_x$ where $0<x \leq 2$. Y' and Y" may each independently be at least one selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), and polonium (Po). Non-limiting examples of the oxide of the metal and/or metalloid alloyable with lithium are a lithium titanium oxide, a vanadium oxide, a lithium vanadium oxide, $SnO_2$, and $SiO_x$ where $0<x<2$.

A composite separator composition, e.g., a composition comprising a fluorinated polymer, at least one selected from an inorganic particle and an organic-inorganic particle, and a copolymer including a first repeating unit of Formula 1, a second repeating unit of Formula 2, and a third repeating unit of Formula 3, may then be coated on the anode and dried to manufacture an anode-composite separator assembly.

The anode-composite separator assembly may be assembled with the cathode, followed by adding an electrolyte, thereby manufacturing the lithium battery.

The lithium battery may further include an additional separator.

In some embodiments, the electrolyte may include a lithium salt and an organic solvent. Non-limiting examples of the organic solvent are at least one selected from a carbonate compound, a glyme compound, and a dioxolane compound. For example, the carbonate compound may be at least one selected from ethylene carbonate, propylene carbonate, dimethyl carbonate, fluoroethylene carbonate, diethyl carbonate, and ethylmethyl carbonate. The glyme compound may be, for example, at least one selected from poly(ethylene glycol)dimethyl ether, tetra(ethylene glycol) dimethyl ether, tri(ethylene glycol)dimethyl ether, poly(ethylene glycol)dilaurate, poly(ethylene glycol) monoacylate, and poly(ethylene glycol)diacrylate.

The dioxolane compound may be, for example, at least one selected from 3-dioxolane, 4,5-diethyl-1,3-dioxolane, 4,5-dimethyl-1,3-dioxolane, 4-methyl-1,3-dioxolane, and 4-ethyl-1,3-dioxolane. For example, the organic solvent may be 2,2-dimethoxy-2-phenyl acetophenone, 1,2-dimethoxyethane (DME), 1,2-diethoxy ethane, tetrahydrofuran, gamma-butyrolactone, and 1,1,2,2-tetrafluoroethyl 2,2,3,3-tetrafluoropropyl ether.

For example, the organic solvent of the electrolyte may include at least one selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, dioxolane, 4-methyl-1,3-dioxolane, N,N-dimethyl formamide, N,N-dimethyl acetamide, dimethylsulfoxide, dioxane, sulforane, dichloroethane, chlorobenzene, nitrobenzene, diethylene glycol, dimethyl ether, 1,1,2,2-tetrafluoroethyl 2,2,3,3-tetrafluoropropyl ether, 1,2-dimethoxy ethane, and 1,2-diethoxy ethane.

For example, the lithium salt in the electrolyte may be at least one selected from LiSCN, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiN(SO_2CF_3)_2$, $LiN(SO_2F)_2$, $LiAlO_2$, $LiAlCl_4$, LiCl, LiI, $LiSbF_6$, $LiPF_3(CF_2CF_3)_3$, $LiPF_3(CF_3)_3$, and $LiB(C_2O_4)_2$. For example, the amount of the lithium salt in the liquid electrolyte may be about 0.01 molar (M) to about 5 M, about 0.01 M to about 2 M, or about 0.1 M to about 1 M.

The electrode-composite separator assembly of the lithium battery may have improved thermal and mechanical stability. The electrode-composite separator assembly may also have improved lithium ionic conductivity and improved wettability to the electrolyte, and thus the lithium battery may have improved electrochemical performance. Since the lithium battery may be manufactured without using a polyolefin-based separator, the lithium battery may be manufactured in any of a variety of forms, and may have improved structural stability against repeated bending or heating. The lithium battery according to an embodiment may prevent shrinkage of the composite separator caused by exposure to high-temperature molding or heat, and may suppress misalignment of the electrodes caused by cell bending or twisting. Thus, battery performance degradation caused from such misalignment and a thermal runaway caused by an internal short circuit may be prevented.

For example, the lithium battery may have improved capacity and improved lifetime characteristics, and thus may be used in a battery cell for use as a power source of a small device, and may also be used as a unit battery of a medium-large size battery pack or battery module that include a plurality of battery cells for use as a power source of a medium-large size device. The lithium battery may have improved voltage characteristics, improved capacity, and improved energy density, and thus may be used in mobile phones, laptop computers, storage batteries for power generating units using wind power or sunlight, electric vehicles, uninterruptable power supplies (UPS), household storage batteries, and the like.

Examples of applications include electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

As used herein, the term "alkyl" refers to a completely saturated branched or unbranched (or straight-chained or linear) hydrocarbon group. Non-limiting examples of the "alkyl" group are methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of the alkyl group may be substituted with at least one selected from a halogen atom, a C1-C20 alkyl group substituted with a halogen atom (for example, $—CF_3$, $—CHF_2$, $—CH_2F$, $—CCl_3$, and the like), a C1-C20 alkoxy group, a C2-C20 alkoxyalkyl group, a hydroxyl group, a nitro group, a cyano group, an amino group, an amidano group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C2-C20 heteroaryl group, a C3-C20 heteroarylalkyl group, a C2-C20 heteroaryloxy group, and a C3-C20 heteroaryloxyalkyl group.

"Alkenyl" means a straight or branched chain, monovalent hydrocarbon group having at least one carbon-carbon double bond (e.g., ethenyl ($—HC=CH_2$)).

"Alkyl" as used herein means a straight or branched chain, saturated, monovalent hydrocarbon group (e.g., methyl or hexyl).

"Arylalkyl" means a substituted or unsubstituted aryl group covalently linked to an alkyl group that is linked to a compound (e.g., a benzyl is a C7 arylalkyl group). "Alkoxy" means an alkyl group that is linked via an oxygen (i.e., alkyl-O—), for example methoxy, ethoxy, and sec-butyloxy groups.

"Aryloxy" means an aryl moiety that is linked via an oxygen (i.e., —O-aryl). An aryloxy group includes a C6 to C30 aryloxy group, and specifically a C6 to C18 aryloxy group. Non-limiting examples include phenoxy, naphthyloxy, and tetrahydronaphthyloxy.

"Alkoxyalkyl" means an alkyl radical substituted with one or more alkoxy groups.

The prefix "hetero" means that the compound or group includes at least one a heteroatom (e.g., 1, 2, or 3 heteroatom(s)), wherein the heteroatom(s) is each independently N, O, S, Si, or P.

One or more embodiments of the present disclosure will now be described in further detail with reference to the following examples. However, these examples are only for illustrative purposes and are not intended to limit the scope of the one or more embodiments of the present disclosure.

EXAMPLES

Example 1: Manufacture of Anode-composite Separator Assembly 100 grams (g) of $Al_2O_3$ having an average particle diameter of about 500 nm and 1.5 g of triethoxyvinylsilane as a dispersing agent were added to 300 g of acetone, and then milled using a bead mill for about 2 hours to obtain a 25 wt %-$Al_2O_3$ acetone dispersion. The amount of the dispersing agent was about 1.5 parts by weight based on 100 parts by weight of $Al_2O_3$.

PVDF 5130 (Solef 5130, available from Solvay America, Inc.) and PVDF 6020 (Solef 6020, available from Solvay America, Inc.) were mixed in a weight ratio of about 1:1 to obtain a 7 wt %-PVDF solution.

A block copolymer (BMV) represented by Formula 4a was added to acetone to obtain a 10 wt %-block copolymer mixture.

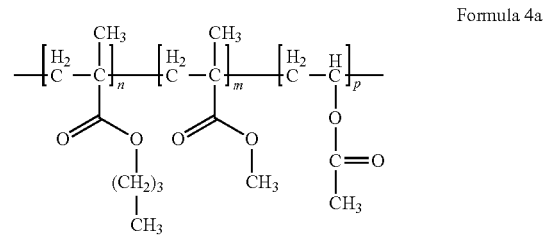

Formula 4a wherein, in Formula 4a, n is 0.4, m is 0.1, and p is 0.5.

The block copolymer had a weight average molecular weight of about 600,000 Daltons, a glass transition temperature of about 36° C. to about 38° C., and a viscosity of about 650 centipoise (cP) at about 25° C. as a 10 wt %-acetone mixture.

The block copolymer mixture was mixed with the PVDF solution, and the 25 wt %-$Al_2O_3$ acetone dispersion was added thereto. The resulting mixture was stirred for about 24 hours to obtain a composite separator composition. A mixed weight ratio of BMV to PVDF in the composite separator composition was about 7:3. The amount of $Al_2O_3$ in the composite separator composition was about 5,000 parts by weight, based on 100 parts by weight of a total amount of the block copolymer and PVDF.

The composite separator composition was coated on an anode using a doctor blade, dried at about 25° C. for 12 hours, and then further dried under vacuum at about 120° C. for about 1 hour to form a composite separator having a thickness of about 30 μm on the anode, thereby manufacturing an anode-composite separator assembly.

The anode was formed as follows. 97.5 wt % of graphite particles (XF10), 1.5 wt % of styrene-butadiene rubber (SBR) as a binder, and 1 wt % of carboxymethyl cellulose (CMC) were mixed together and then with distilled water, and stirred using a mechanical stirrer for about 60 minutes (min) to prepare an anode active material layer composition. The anode active material layer composition was coated on a copper current collector having a thickness of about 10 μm using a doctor blade to a thickness of about 60 μm, dried in a 100° C. hot air drier for about 0.5 hours and then again at about 120° C. under vacuum for about 4 hours, and roll-pressed to manufacture the anode.

Examples 2 to 5: Manufacture of Anode-composite Separator Assembly

Electrode-composite separator assemblies were manufactured in the same manner as in Example 1, except that the mixed weight ratio of BMV to PVDF in the composite separator composition was varied to about 1:9, 5:5, 3:7, and 9:1, respectively.

Example 6: Manufacture of Anode-composite Separator Assembly

An electrode-composite separator assembly was manufactured in the same manner as in Example 1, except that the amount of $Al_2O_3$ in the composite separator composition was varied to about 500 parts by weight based on 100 parts by weight of a total amount of the block copolymer and PVDF.

Example 7: Manufacture of Lithium Secondary Battery $LiCoO_2$, a conducting agent (Super-P, available from Timcal Ltd.), polyvinylidene fluoride (PVdF), and N-methylpyrrolidone were mixed together to obtain a cathode active material layer composition. A mixed weight ratio of $LiCoO_2$, the conducting agent, and polyvinylidene fluoride (PVdF) in the cathode active material layer composition was about 97:1.5:1.5.

The cathode active layer material composition was coated on an aluminum foil (having a thickness of about 15 μm), dried at about 25° C., and then further dried at about 110° C. under vacuum to manufacture a cathode.

The cathode and the anode-composite separator assembly of Example 1 were stacked upon one another, and a liquid electrolyte was then injected into the resulting structure, thereby manufacturing a lithium secondary battery. The cathode was disposed adjacent to the composite separator of the anode-composite separator assembly. The cathode had a size of about 2 cm×10 cm, and the anode was larger than the cathode by about 0.1 cm both in length and width.

The liquid electrolyte was a mixture of i) a solution of 1.15 molar (M) $LiPF_6$ dissolved in a mixed solvent of ethylene carbonate (EC), ethyl methyl carbonate (EMC), and diethyl carbonate (DEC) in a mixed volume ratio of about 3:5:2, ii) 0.2 wt % of $LiBF_4$ based on a total weight of the liquid electrolyte iii) 5.0 wt % of fluoroethylene carbonate (FEC), based on the total weight of the liquid electrolyte, iv) 0.5 wt % of vinyl ethylene carbonate (VEC), based on the total weight of the liquid electrolyte, and v) 3.0 wt % of succinonitrile (SN), based on the total weight of the liquid electrolyte.

Examples 8 to 12: Manufacture of Lithium Secondary Battery

Lithium secondary batteries were manufactured in the same manner as in Example 7, except that the anode-composite separator assemblies of Examples 2 to 6, instead of the anode-composite separator assembly of Example 1, were used, respectively.

Comparative Example 1: Manufacture of Lithium Secondary Battery $LiCoO_2$, a conducting agent (Super-P, available from Timcal Ltd.), polyvinylidene fluoride (PVdF), and N-methylpyrrolidone were mixed together to obtain a cathode active material layer composition. A weight ratio of $LiCoO_2$, the conducting agent, and polyvinylidene fluoride (PVdF) in the cathode active material layer composition was about 97:1.5:1.5. The cathode active layer material composition was coated on an aluminum foil (having a thickness of about 15 μm), dried at about 25° C., and then further dried at about 110° C. under vacuum to manufacture a cathode.

97.5 wt % of graphite particles (XF10), 1.5 wt % of SBR as a binder, and 1 wt % of CMC were mixed together and then with distilled water, and stirred using a mechanical stirrer for about 60 min to prepare an anode active material layer composition. The anode active material layer composition was coated on a copper current collector having a thickness of about 10 μm using a doctor blade to a thickness of about 60 μm, dried in a 100° C. hot air drier for about 0.5 hours and then again at about 120° C. under vacuum for about 4 hours, and roll-pressed to manufacture an anode.

A polyethylene/polypropylene (PE/PP) separator was disposed between the cathode and the anode. A liquid electrolyte was injected into the resulting structure, thereby manufacturing a lithium secondary battery. The liquid electrolyte used was a mixture of i) a solution of 1.15 M $LiPF_6$ dissolved in a mixed solvent of ethylene carbonate (EC), ethyl methyl carbonate (EMC), and diethyl carbonate (DEC) in a volume ratio of about 3:5:2, ii) 0.2 wt % of $LiBF_4$ based on a total weight of the liquid electrolyte iii) 5.0 wt % of fluoroethylene carbonate (FEC) based on the total weight of the liquid electrolyte, iv) 0.5 wt % of vinyl ethylene carbonate (VEC) based on the total weight of the liquid electrolyte, and v) 3.0 wt % of succinonitrile (SN) based on the total weight of the liquid electrolyte.

Comparative Example 2: Manufacture of Lithium Secondary Battery $LiCoO_2$, a conducting agent (Super-P, available from Timcal Ltd.), polyvinylidene fluoride (PVdF), and N-methylpyrrolidone were mixed together to obtain a cathode active material layer composition. A mixed weight ratio of $LiCoO_2$, the conducting agent, and PVdF in the cathode active material layer composition was about 97:1.5:1.5. The cathode active material layer composition was coated on an aluminum foil (having a thickness of about 15 μm), dried at about 25° C., and then further dried at about 110° C. under vacuum to manufacture a cathode.

$Al_2O_3$ having an average particle diameter of about 500 nm and triethoxyvinylsilane as a dispersing agent were added to acetone, and then milled using a bead mill for about 2 hours to obtain a 25 wt %-$Al_2O_3$ acetone dispersion. The amount of the dispersing agent was about 1.5 parts by weight based on 100 parts by weight of $Al_2O_3$.

PVDF 5130 (Solef 5130, available from Solvay America, Inc.) and PVDF 6020 (Solef 6020, available from Solvay America, Inc.) were mixed in a weight ratio of about 1:1 to obtain a 7 wt %-PVDF solution.

The PVDF solution and the 25 wt %-$Al_2O_3$ acetone dispersion were mixed together and stirred for about 24 hours to obtain a separator composition. The amount of $Al_2O_3$ in the separator composition was about 5,000 parts by weight based on 100 parts by weight of a total amount of PVDF.

The separator composition was coated on a surface of an anode manufactured according to Example 1, using a doctor blade, dried at about 25° C. for 12 hours, and then further dried under vacuum at about 120° C. for about 1 hour to form a separator having a thickness of about 30 μm on the anode, thereby manufacturing an anode-separator assembly.

The cathode and the anode-separator assembly were stacked upon one another, and a liquid electrolyte was then injected into the resulting structure, thereby manufacturing a lithium secondary battery. The cathode was disposed adjacent to the separator of the anode-separator assembly.

The liquid electrolyte was a mixture of i) a solution of 1.15M $LiPF_6$ dissolved in a mixed solvent of ethylene carbonate (EC), ethyl methyl carbonate (EMC), and diethyl carbonate (DEC) in a mixed volume ratio of about 3:5:2, ii) 0.2 wt % of $LiBF_4$ based on a total weight of the liquid electrolyte iii) 5.0 wt % of fluoroethylene carbonate (FEC) based on the total weight of the liquid electrolyte, iv) 0.5 wt % of vinyl ethylene carbonate (VEC) based on the total weight of the liquid electrolyte, and v) 3.0 wt % of succinonitrile (SN) based on the total weight of the liquid electrolyte.

Comparative Example 3: Manufacture of Lithium Secondary Battery $LiCoO_2$, a conducting agent (Super-P, available from Timcal Ltd.), polyvinylidene fluoride (PVdF), and N-methylpyrrolidone were mixed together to obtain a cathode active material layer composition. A mixed weight ratio of $LiCoO_2$, the conducting agent, and PVdF in the cathode active material layer composition was about 97:1.5:1.5. The cathode active material layer composition was coated on an aluminum foil (having a thickness of about 15 μm), dried at about 25° C., and then further dried at about 110° C. under vacuum to manufacture a cathode.

An anode-separator assembly was manufactured as follows. $Al_2O_3$ having an average particle diameter of about 500 nm and triethoxyvinylsilane as a dispersing agent were added to acetone, and then milled using a beads mill for about 2 hours to obtain a 25 wt %-$Al_2O_3$ acetone dispersion. The amount of the dispersing agent was about 1.5 parts by weight based on 100 parts by weight of $Al_2O_3$.

A block copolymer (BMV) represented by Formula 4a was added to acetone to obtain a 10 wt %-block copolymer mixture.

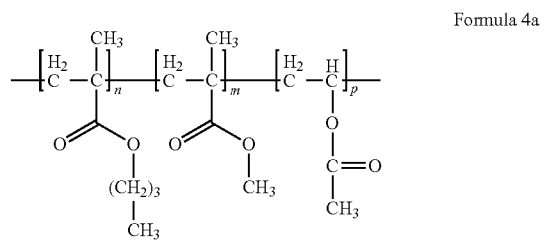

Formula 4a wherein, in Formula 4a, n is 0.4, m is 0.1, and p is 0.5.

The block copolymer had a weight average molecular weight of about 600,000 Daltons, a glass transition temperature of about 36° C. to about 38° C., and a viscosity of about 650 cP at 25° C. as a 10 wt %-acetone mixture.

The block copolymer mixture was mixed with the 25 wt %-$Al_2O_3$ acetone dispersion and stirred for about 24 hours to obtain a composite separator composition. The amount of $Al_2O_3$ in the separator composition was about 5,000 parts by weight based on 100 parts by weight of the block copolymer.

The separator composition was coated on an anode using a doctor blade, dried at about 25° C. for 12 hours, and then further dried under vacuum at about 120° C. for about 1 hour to form a separator having a thickness of about 30 μm on the anode, thereby manufacturing an anode-separator assembly.

The cathode and the anode-separator assemblies were stacked upon one another, and a liquid electrolyte was then injected into the resulting structure, thereby manufacturing a lithium secondary battery. The cathode was disposed adjacent to the separator of the anode-separator assembly.

The liquid electrolyte was a mixture of i) a solution of 1.15 M $LiPF_6$ dissolved in a mixed solvent of ethylene carbonate (EC), ethyl methyl carbonate (EMC), and diethyl carbonate (DEC) in a mixed volume ratio of about 3:5:2, ii) 0.2 wt % of $LiBF_4$ based on a total weight of the liquid electrolyte iii) 5.0 wt % of fluoroethylene carbonate (FEC) based on the total weight of the liquid electrolyte, iv) 0.5 wt % of vinyl ethylene carbonate (VEC) based on the total weight of the liquid electrolyte, and v) 3.0 wt % of succinonitrile (SN) based on the total weight of the liquid electrolyte.

In the lithium secondary battery of Comparative Example 3, it was found that the separator in the anode-separator assembly was still easily delaminated from the anode and not able to maintain the membrane form.

Comparative Example 4: Manufacture of Lithium Secondary Battery $LiCoO_2$, a conducting agent (Super-P, available from Timcal Ltd.), polyvinylidene fluoride (PVdF), and N-methylpyrrolidone were mixed together to obtain a cathode active material layer composition. A mixed weight ratio of $LiCoO_2$, the conducting agent, and PVdF in the cathode active material layer composition was about 97:1.5:1.5. The cathode active material layer composition was coated on an aluminum foil (having a thickness of about 15 μm), dried at about 25° C., and then further dried at about 110° C. under vacuum to manufacture a cathode.

A block copolymer (BMV) represented by Formula 4a was added to acetone to obtain a 10 wt %-block copolymer mixture.

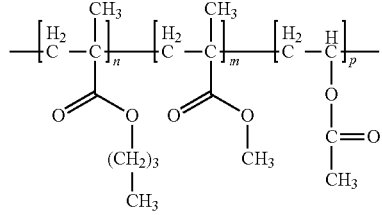

Formula 4a wherein, in Formula 4a, n is 0.4, m is 0.1, and p is 0.5.

The block copolymer had a weight average molecular weight of about 600,000 Daltons, a glass transition temperature of about 36° C. to about 38° C., and a viscosity of about 650 cP at 25° C. as a 10 wt %-acetone mixture.

The block copolymer mixture was coated on an anode using a doctor blade, dried at about 25° C. for about 12 hours, and then further dried under vacuum at about 120° C. for about 1 hour to form a separator having a thickness of about 30 μm on the anode, thereby manufacturing an anode-separator assembly.

The cathode and the anode-separator assembly were stacked upon one another, and a liquid electrolyte was then injected into the resulting structure, thereby manufacturing a lithium secondary battery. The cathode was disposed adjacent to the separator of the anode-separator assembly.

The liquid electrolyte was a mixture of i) a solution of 1.15 M $LiPF_6$ dissolved in a mixed solvent of ethylene carbonate (EC), ethyl methyl carbonate (EMC), and diethyl carbonate (DEC) in a mixed volume ratio of about 3:5:2, ii) 0.2 wt % of $LiBF_4$ based on a total weight of the liquid electrolyte iii) 5.0 wt % of fluoroethylene carbonate (FEC) based on the total weight of the liquid electrolyte, iv) 0.5 wt % of vinyl ethylene carbonate (VEC) based on the total weight of the liquid electrolyte, and v) 3.0 wt % of succinonitrile (SN) based on the total weight of the liquid electrolyte.

The lithium secondary battery of Comparative Example 4 was found not to be practically applicable due to severe swelling and dissolution in the liquid electrolyte.

Evaluation Example 1: Scanning Electron Microscopy (SEM)

The anode-composite separator assembly of Example 1 and the anode separator assembly of Comparative Example 2 were analyzed by scanning electron microscopy (SEM). The SEM results of the anode-composite separator assembly of Example 1 and the anode separator assembly of Comparative Example 2 are shown in FIGS. 2 and 3, respectively.

Figure 2:
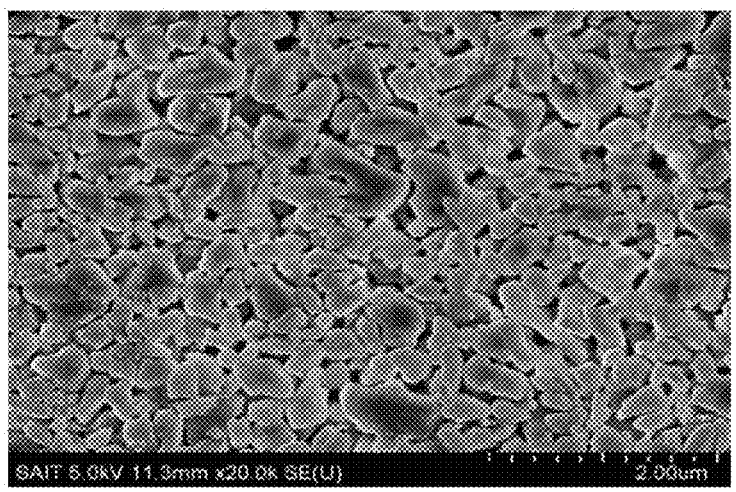
FIGS. 2 and 3 are scanning electron microscope (SEM) images of an anode-composite separator assembly of Example 1 and an anode-separator assembly of Comparative Example 2, respectively.
Figure 3:
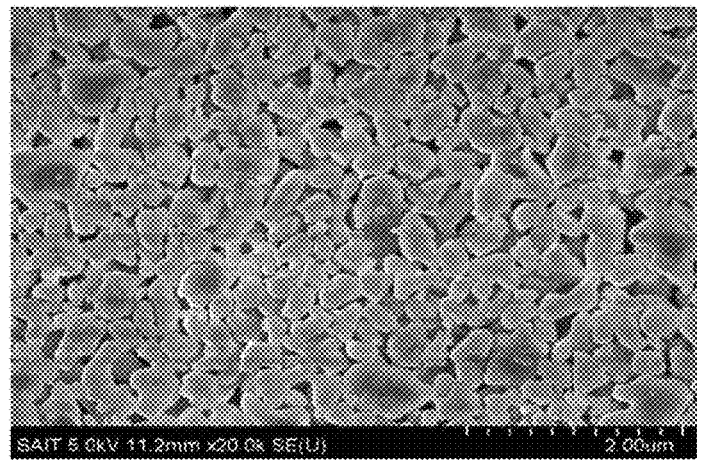

Referring to FIGS. 2 and 3, the anode-composite separator assembly of Example 1 shown in FIG. 2 has the composite separator having pores like the anode separator of Comparative Example 2 shown in FIG. 3, and the anode-composite separator assembly of Example 1 was found to have a similar morphology to that of the anode separator assembly of Comparative Example 2.

Evaluation Example 2: Porosity

Separator porosity was evaluated using the anode-composite separator assembly of Example 1 and the anode separator assembly of Comparative Example 2, based on measured densities and theoretical densities of the composite separator of Example 1 and the separator of Comparative Example 2. The results of the porosity evaluation are shown in Table 1.

TABLE 1

| Example | Porosity (%) |
| --- | --- |
| Example 1 | 57.75 |
| Comparative Example 2 | 52.25 |

Referring to Table 1, the anode-composite separator assembly of Example 1 is found to have a higher porosity in the composite separator thereof, compared to that of the separator of Comparative Example 2. A higher porosity of the composite separator may lead to an increased lithium ion mobility.

Evaluation Example 3: High-temperature Stability (Open Circuit Voltage Change During Thermal Storage)

A lithium secondary battery was manufactured in the same manner as in Example 7, except that a liquid electrolyte prepared as follows was used.

The liquid electrolyte was a solution of 1.2 M $LiBF_4$ dissolved in a mixed solvent of ethylene carbonate (EC), propylene carbonate (PC), gamma butyrolactone (GBL), and fluoroethylene carbonate (FEC) in a volume ratio of about 16:18:50:16. The lithium secondary battery manufactured as described above and the lithium secondary battery of Comparative Example 1 were charged with a constant current (0.1 C) at about 25° C. to about 4.35V (with respect to Li), and then charged at the same voltage (4.35V) with a cut-off current of 0.01 C. The C rate is a discharge rate of a cell, and is obtained by dividing a total capacity of the cell by a total discharge period of time, e.g., a C rate for a battery having a discharge capacity of 1.6 ampere-hours would be 1.6 amperes. Each lithium secondary battery was separated in a charged state from a charger/discharger, and moved into an oven.

Each of the lithium secondary batteries was stored in an oven while increasing the temperature, and an open circuit voltage (OCV) of each of the lithium secondary batteries was continuously checked with a digital multi-meter. The temperature rise profile during the storage includes: continuously raising the temperature to about 150° C. for about 10 minutes, maintaining the temperature for about 30 minutes, raising the temperature to about 170° C. for about 3 minutes, maintaining the temperature for about 15 minutes, and raising the temperature to about 180° C. for about 3 minutes, and maintaining the temperature for about 2 hours. After the thermal storage, OCV changes in each of the lithium secondary batteries were evaluated. The results are shown in FIG. 4.

As a result of the evaluation, the lithium secondary battery of Comparative Example 1 was found to undergo an OCV drop to about 3.5V after the temperature maintenance at about 180° C. for about 15 minutes, and a final short circuit in 30 minutes after the OCV drop. However, the lithium secondary battery of Example 7 was found to undergo an OCV drop to about 3.8V after the temperature maintenance at about 180° C. for about 15 minutes and a final short circuit in 90 minutes after the OCV drop. A thermal storage may cause damage in a separator and a short circuit along with a gradual drop in OCV. The lithium secondary battery of Example 7 was found to have improved thermal stability from the delay both in voltage drop and final short circuit occurrence, compared to the lithium secondary battery of Comparative Example 1.

Figure 4:
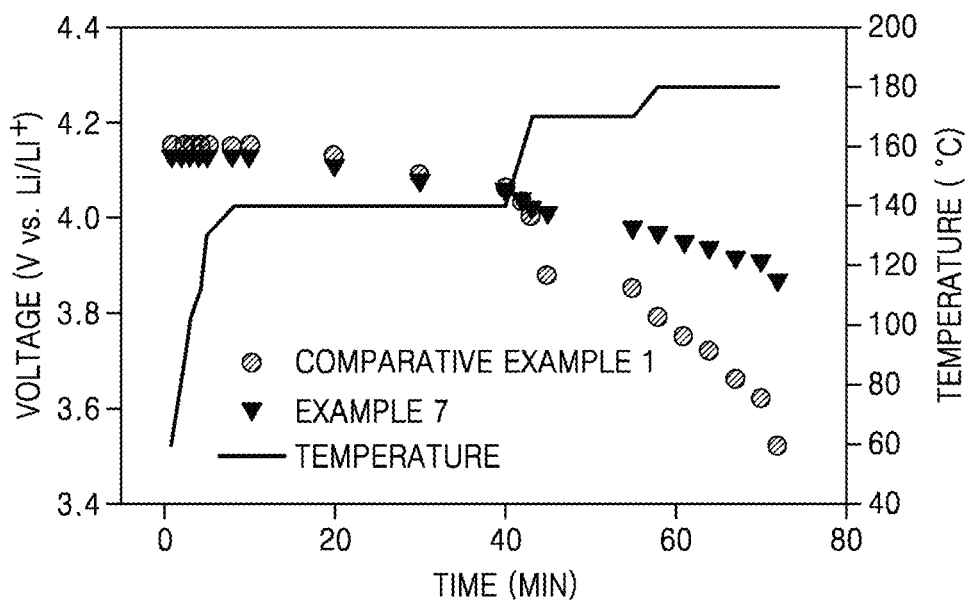
FIG. 4 is a graph of open circuit voltage (Volts, V vs. Li/Li+) and temperature (degrees Celsius, ° C.) versus thermal storage time (minutes, min) for the lithium secondary batteries of Example 7 and Comparative Example 1.

As shown in FIG. 4, in the lithium secondary battery of Example 7, because of generation of a current path upon damage of the composite separator thereof, an OCV drop caused by self-discharge was reduced.

The lithium secondary battery of Comparative Example 1 was found to undergo an OCV drop with a degree of decrease gradually increasing with increased temperature and increased time of cell storage. In the lithium secondary battery of Comparative Example 1, a short circuit occurred in about 30 minutes after the storage.

However, in the lithium secondary battery of Example 7, damage of the composite separator caused by thermal exposure was reduced, compared to the lithium secondary battery of Comparative Example 1. Accordingly, the degree of self-discharge was also relatively small in the lithium secondary battery of Example 7, compared to the lithium secondary battery of Comparative Example 1, so that a short circuit in the lithium secondary battery of Example 7 occurred after 90 minutes from the storage.

Evaluation Example 4: High-temperature Stability (Shrinkage Ratio Change During Thermal Storage)

After the anode-composite separator assembly of Example 7, the separator of Comparative Example 1, and the anode-separator assembly of Comparative Example 3 were stored at about 150° C. for about 30 min and about 45 min, a change in shrinkage ratio in each of the separators was measured. The results are shown in Table 2.

TABLE 2

| Example | Shrinkage ratio (@ 150° C., 30 min) (%) | Shrinkage ratio (@150° C., 45 min) (%) |
|---|---|---|
| Example 1 | 0 | 0 |
| Comparative Example 1 (PE/PP separator) | 30 | 56 |
| Comparative Example 3 | 18 | 42 |

Referring to Table 2, the composite separator of Example 1 was found to undergo essentially no deformation, unlike the separators of Comparative Examples 1 and 3, indicating that the composite separator of Example 1 may have improved high-temperature stability, compared to the separators of Comparative Examples 1 and 3.

Evaluation Example 5: Structural Stability (Cell Twisting)

The lithium secondary batteries of Example 7 and Comparative Example 1 were subjected to twisting of a cell's lower portion with a lead tap unit of each of the lithium secondary batteries fixed. Cell twisting was performed repeatedly at about +75° or −75°.

As the results of the cell twisting evaluation, the lithium secondary battery of Example 1 was found to be twisted less, compared to the lithium secondary batteries of Comparative Example 1, and thus to have improved structural stability.

Evaluation Example 6: Structural Stability (Misalignment Evaluation after Cell Disassembling)

After disassembling the lithium secondary batteries of Example 7 and Comparative Example 1, a misalignment between the electrode and the separator was observed using an optical microscope. The results are shown in FIGS. 5A and 5B.

Figure 5A:
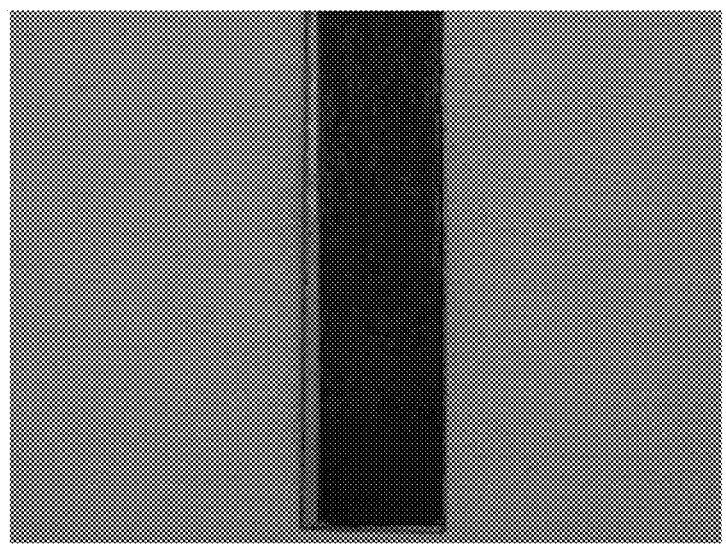
FIGS. 5A and 5B are optical microscope images of the lithium secondary batteries of Example 7 and Comparative Example 1, respectively, after cell disassembly.
Figure 5B:
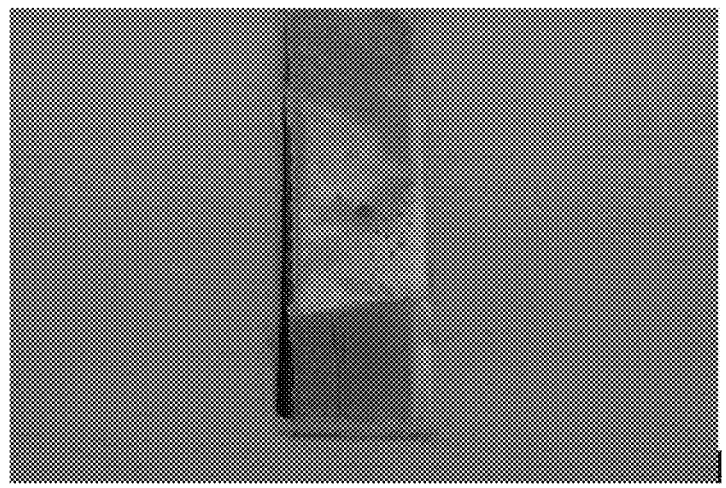

Referring to FIG. 5A, in the lithium secondary battery of Example 7, an electrode surface appears not to be exposed after the cell disassembly. However, as shown in FIG. 5B, the lithium secondary battery of Comparative Example 1 was found to be highly likely to undergo a short circuit due to exposed electrode.

Evaluation Example 7: Charge-discharge Characteristics (Rate Capability)

The lithium secondary batteries of Example 7 and Comparative Examples 1 and 2 were each charged at about 25° C. with a constant current of 0.1 C to a voltage of about 4.35V, charged at the same voltage with a cut-off current of about 0.01 C, and then discharged with a constant current of 0.1 C to a voltage of about 3.0V. These processes were repeated two cycles (Formation process). Next, the charge and discharge rates was varied from 0.1 C to 1.0 C, wherein charging with a constant voltage was performed with a cut-off current of about 0.1 C. The discharge rate was periodically changed to 0.1 C and 1 C with an increased number of charge and discharge cycles to evaluate high rate discharge characteristics (also referred to as rate capability) of the lithium secondary batteries. The high rate discharge characteristics may be represented by Equation 3.

$$\text{High-rate discharge characteristics (\%)} = (\text{Discharge capacity at 1 C})/(\text{Discharge capacity at 0.1 C}) \times 100\% \quad \text{Equation 3}$$

The high rate discharge characteristics of the lithium secondary batteries are shown in Table 3.

TABLE 3

| Example | 0.1 C (mAh) | 1.0 C (mAh) | 1.0 C/0.1 C (%) |
|---|---|---|---|
| Example 7 | 22 | 18.9 | 85.6 |
| Comparative Example 1 (PE/PP separator) | 22 | 18.5 | 84 |
| Comparative Example 2 | 21.8 | 18.1 | 82.9 |

Referring to Table 3, the lithium secondary battery of Example 7 was found to have improved high-rate discharge characteristics, compared to those of the lithium secondary batteries of Comparative Examples 1 and 2.

Evaluation Example 8: Charge-discharge Characteristics (Lifetime Characteristics)

The lithium secondary batteries of Example 7 and Comparative Example 1 were each charged at about 25° C. with a constant current of 0.1 C to a voltage of about 4.35V, discharged at the same voltage with a cut-off current of about 0.01 C, and then discharged with a constant current of 0.1 C to a voltage of about 3.0V. These processes were repeated two cycles (Formation process). Next, the charge and discharge rates was varied from 0.1 C to 1.0 C, wherein charging with a constant voltage was performed with a cut-off current of about 0.1 C. The charge and discharge cycle was repeated 100 times in total. The cycle lifetimes of the lithium secondary batteries are shown in FIG. 6.

Figure 6:
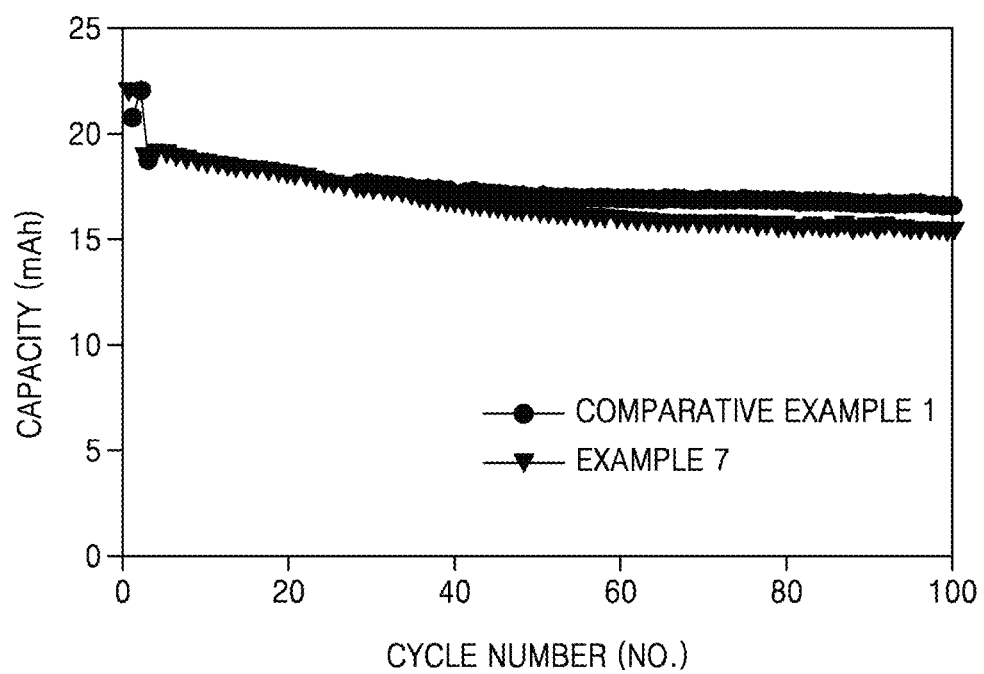
FIG. 6 is a graph of capacity (milliAmpere-hours, mAh) versus cycle number illustrating lifetime characteristics of the lithium secondary batteries of Example 7 and Comparative Example 1.

Referring to FIG. 6, the lithium secondary battery of Example 7 was found to exhibit similar lifetime characteristics at 1 C, to those of the lithium secondary battery of Comparative Example 1 using a polyethylene/polypropylene (PE/PP) separator.

Evaluation Example 9: Charge-discharge Characteristics (Voltage Profile and High-Rate Discharge Characteristics)

The lithium secondary batteries of Example 7, Examples 9 to 11, and Comparative Examples 1 to 3 were each charged at about 25° C. with a constant current of 0.1 C rate to a voltage of about 4.35V (with respect to Li), charged at the same voltage of 4.35V (constant voltage mode) with a cut-off current of about 0.01 C, and then discharged with a constant current of 0.1 C or 1.0 C to a voltage of about 3.0V (with respect to Li). This charge and charge cycle was repeated.

Voltage profiles of the lithium secondary batteries of Example 7, Examples 9 to 11, and Comparative Example 1 with respect to capacity are shown in FIGS. 7A to 7F, respectively. Discharge capacities and high-rate characteristics of the lithium secondary batteries of Example 7, Examples 9 to 11, and Comparative Examples 1 and 2 are shown in Table 4.

TABLE 4

| Example | Discharge capacity at 0.1 C (mAh) | Discharge capacity) at 1.0 C (mAh) | 1.0 C/0.1 C |
|---|---|---|---|
| Example 7 | 22.08 | 18.9 | 85.6 |
| Example 9 | 22.02 | 18.49 | 84.0 |
| Example 10 | 21.90 | 18.26 | 83.4 |
| Example 11 | 22.09 | 18.37 | 83.2 |
| Comparative Example 1 | 21.95 | 18.50 | 84.3 |
| Comparative Example 2 | 21.80 | 18.07 | 82.9 |

Referring to Table 4, the lithium secondary batteries of Example 7 and Examples 9 to 11 were found to have good high rate characteristics. In particular, the lithium secondary batteries of Examples 9, 10, and 11 had improved high-rate characteristics, compared to those of the lithium secondary battery of Comparative Example 2.

Referring to Table 4, the lithium secondary batteries of Examples 10 and 11 including the integrated the anode-composite separator assembly using a block copolymer exhibited slightly lower high-rate characteristics, due to increased resistance, compared to those of the lithium secondary battery of Comparative Example 1 using a PE/PP separator. However, the lithium secondary batteries of Examples 10 and 11 had improved high-rate characteristics, compared to those of the lithium secondary battery of Comparative Example 2.

Figure 7A:
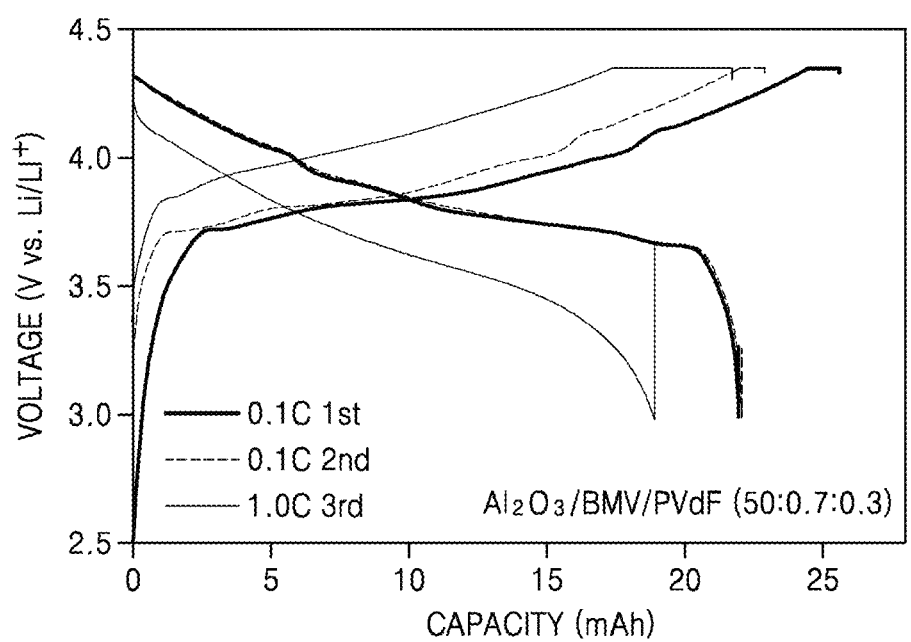
FIGS. 7A to 7F are graphs of voltage profile (Volts, V vs. Li/Li+) versus capacity (milliAmpere-hours, mAh) for the lithium secondary batteries of Example 7, Examples 9 to 11, and Comparative Example 1, respectively.
Figure 7B:
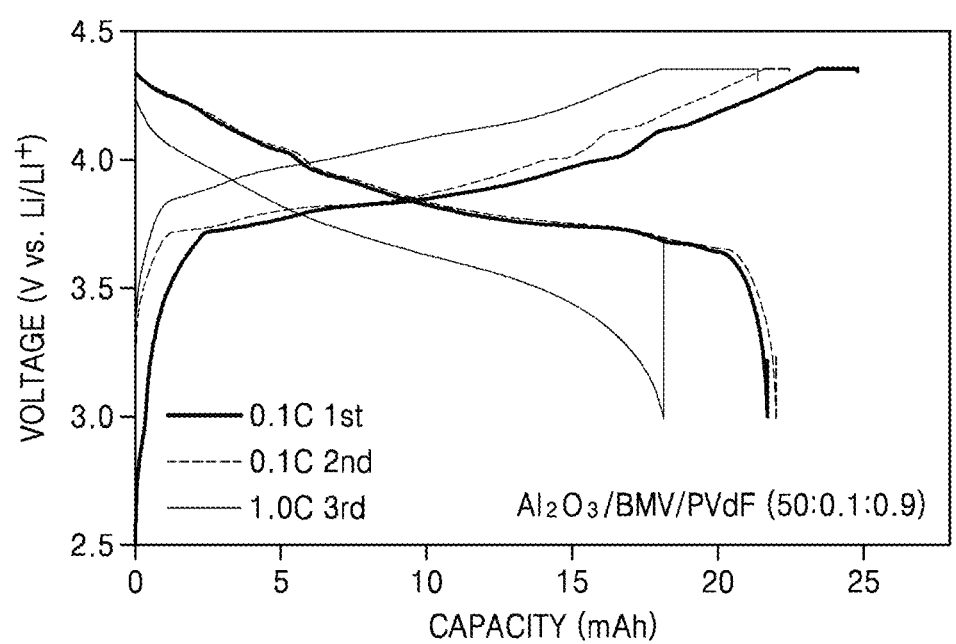
Figure 7C:
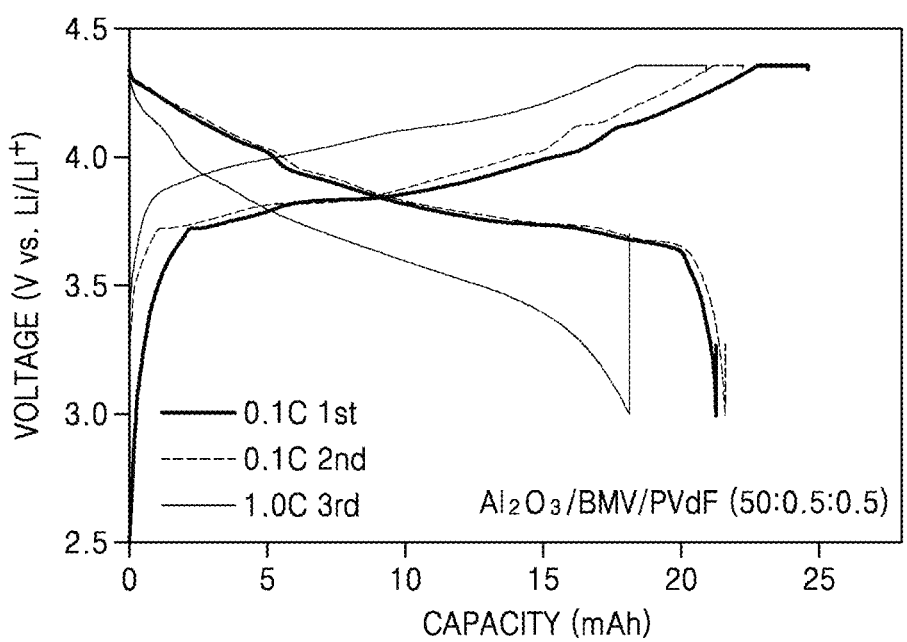
Figure 7D:
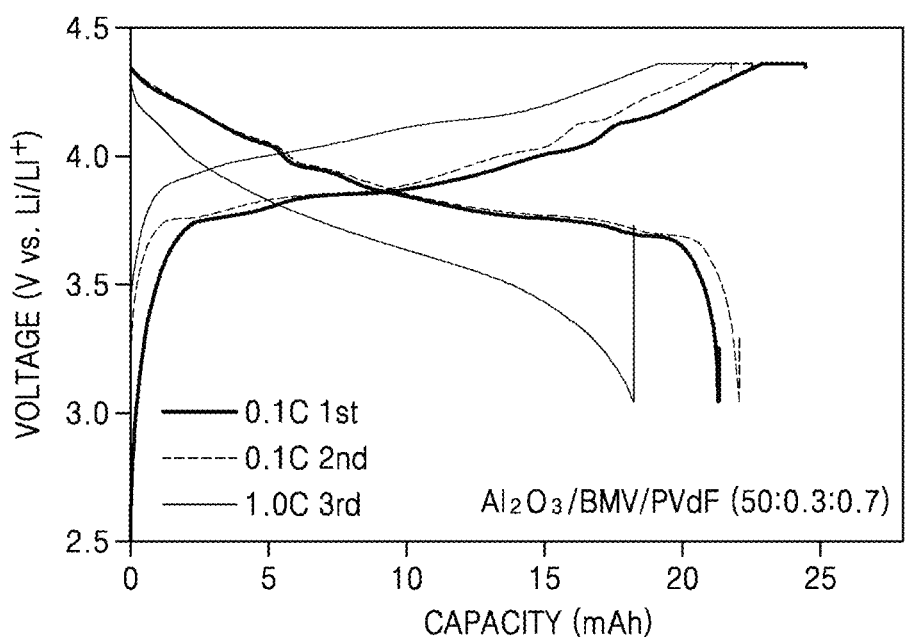
Figure 7E:
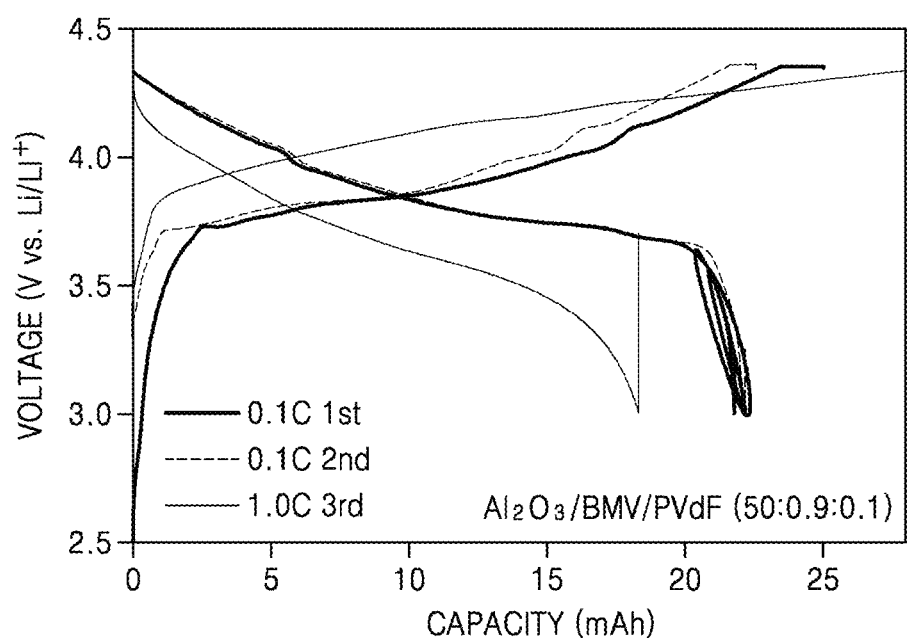
Figure 7F:
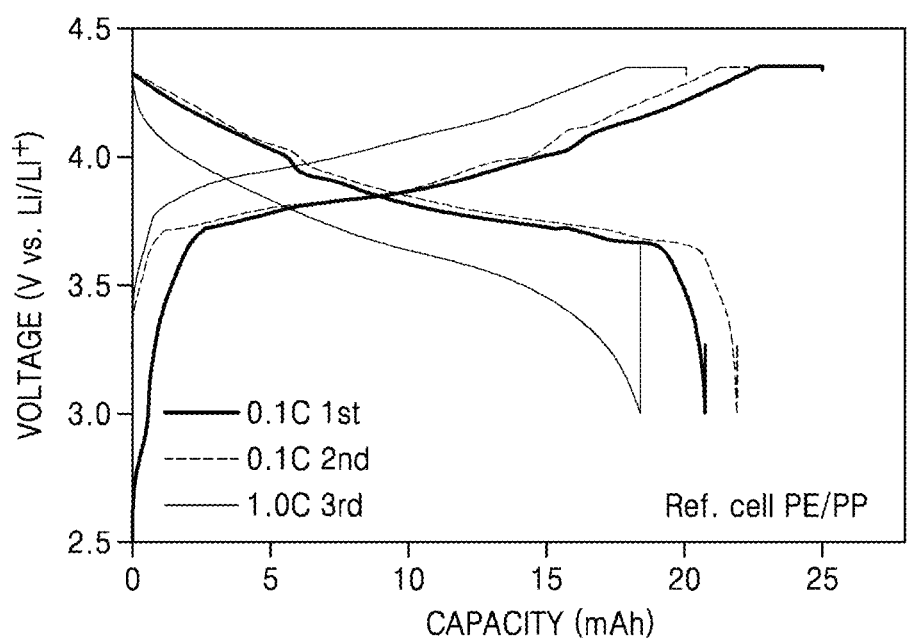

Referring to FIGS. 7A to 7D, the lithium secondary batteries of Example 7 and Examples 9 to 11 exhibit comparatively stable charge-discharge behavior even at an increased discharge rate. FIG. 7E illustrates charge-discharge behaviors of the lithium secondary battery of Comparative Example 1.

Though voltage profile characteristics of the lithium secondary battery of Comparative Example 3 were also evaluated in the same manner as performed on the lithium secondary batteries of Example 7, Examples 9 to 11, and Comparative Example 1, it was failed to obtain a voltage profile thereof due to a difficulty with operating the lithium secondary battery of Comparative Example 3.

Evaluation Example 10: Electrolyte Impregnation Test

Each of the block copolymer (BMV) of Formula 4a used in Example 1, KF9300 (PVDF, Kureha Inc.), and Solef 21216 (PVdF-HFP, Solvay Solexis Inc.) was mixed with a solvent, and then cast to form a polymer membrane having a thickness of about 50 μm.

In particular, BMV was dissolved in acetone solvent to obtain a 10 wt % BMV solution, KF9300 was dissolved in N-methylpyrrolidone (NMP) solvent to obtain a 7 wt % KF9300 solution, and Solef 21216 was dissolved in acetone solvent to obtain a 15 wt % Solef 21216 solution.

Each of the polymer membranes was impregnated with an electrolyte solution for about 1 week or more, followed by comparing weights of the polymer membrane before and after the impregnation to obtain a weight increase ratio. The results of the weight increase ratio evaluation are shown in Table 5.

TABLE 5

| Polymer type | Weight increase ratio after impregnation (%) |
|---|---|
| KF9300 (PVDF) solution | 45 |
| Solef 21216 (PVdF-HFP) solution | 135 |
| BMV solution | >250 |

Referring to Table 5, the block copolymer (BMV) solution was found to have improved electrolyte impregnation ability, compared to KF9300 and Solef 21216 solutions.

As described above, according to the one or more embodiments, an electrode-composite separator assembly may have improved structural stability under bending, twisting, or heating conditions without using a polyolefin-based separator. A lithium battery including the electrode-composite separator assembly may have improved stability and electrochemical performance under repeated deformation conditions.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrode-composite separator assembly for a lithium battery, the electrode-composite separator assembly comprising:
   an electrode; and
   a composite separator,
      wherein the electrode and composite separator are integrated to form an indivisible assembly, and
      wherein the composite separator comprises
         a copolymer comprising a first repeating unit represented by Formula 1, a second repeating unit represented by Formula 2, and a third repeating unit represented by Formula 3,
at least one selected from an inorganic particle and an organic-inorganic particle, and
at least one polymer selected from a fluorinated polymer and a heat-resistant polymer;
wherein Formulas 1 to 3 are

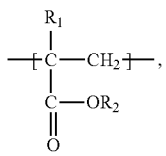

Formula 1 wherein, in Formula 1,
$R_1$ is a hydrogen or a C1-05 alkyl group, and
$R_2$ is a C2-C20 alkyl group,

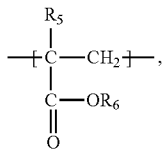

Formula 2 wherein in Formula 2,
$R_5$ is a hydrogen or a C1-C5 alkyl group, and
$R_6$ is a methyl group, and

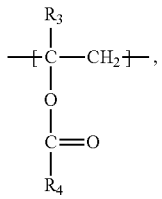

Formula 3 wherein in Formula 3,
$R_3$ is a hydrogen or a C1-C5 alkyl group, and
$R_4$ is a C1-C10 alkyl group.

2. The electrode-composite separator assembly of claim 1, wherein the first repeating unit represented by Formula 1 is at least one selected from an ethyl (meth)acrylate unit, propyl (meth)acrylate unit, a butyl (meth)acrylate unit, a pentyl meth)acrylate unit, a hexyl (meth)acrylate unit, and an octyl (meth)acrylate unit.

3. The electrode-composite separator assembly of claim 1, wherein the third repeating unit represented by Formula 3 is a vinyl acetate unit.

4. The electrode-composite separator assembly of claim 1, wherein an amount of the second repeating unit represented by Formula 2 in the copolymer is about 0.1 mole to about 1.5 moles, based on 1 mole of the first repeating unit represented by Formula 1.

5. The electrode-composite separator assembly of claim 4, wherein an amount of the third repeating unit represented by Formula 3 in the copolymer is about 0.1 mole to about 3.5 moles, based on 1 mole of the first repeating unit represented by Formula 1.

6. The electrode-composite separator assembly of claim 1, wherein an amount of the second repeating unit represented by Formula 2 is about 0.15 mole to about 0.5 mole, based on 1mole of the first repeating unit represented by Formula 1.

7. The electrode-composite separator assembly of claim 1, wherein an amount of the third repeating unit represented by Formula 3 is about 0.5 mole to about 1.5 moles, based on 1 mole of the first repeating unit represented by Formula 1.

8. The electrode-composite separator assembly of claim 1, wherein the copolymer is a polymer represented by Formula 4a or Formula 4b:

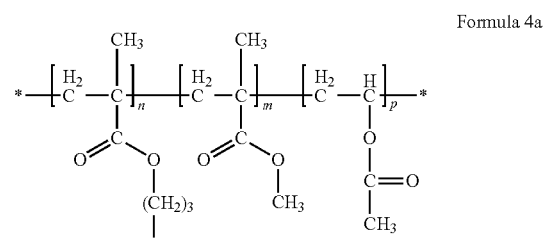

Formula 4a

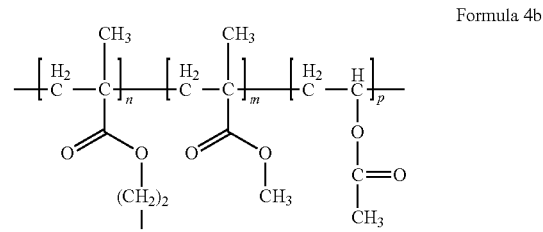

Formula 4b wherein, in Formula 4a and Formula 4b, n, m, and p are mole fractions of the first to third repeating units, respectively, and are each independently about 0.01 to about 0.99, and
wherein a sum of n, m. and p is 1.

9. The electrode-composite separator assembly of claim 1, wherein the fluorinated polymer is at least one selected from polyvinylidene fluoride, a vinylidene fluoride-hexafluoropropylene copolymer, a vinylidene fluoride-trichloroethylene copolymer, and a vinylidene fluoride-chlorotrifluoroethylene copolymer.

10. The electrode-composite separator assembly of claim 1, wherein the fluorinated polymer comprises a high-viscosity, high-molecular weight fluorinated polymer having a viscosity of about 3,000 to about 5,000 centipoise when determined in acetone in an amount of 2 to 5 weight percent and a weight average molecular weight of about 1,000,000 to about 1,200,000 Daltons, and
a high-elasticity, low-viscosity fluorinated polymer having a viscosity of about 2,000 to about 4,000 centipoise when determined in acetone in an amount of 2 to 5 weight percent and a tensile modulus of about 1,300 to about 2,000 megaPascals.

11. The electrode-composite separator assembly of claim 1, wherein the heat-resistant polymer is at least one selected from a polyimide, polyethersulfone, polyvinylidene fluoride, polyamide, poly(meta-phenylene isophthalamide), polysulfone, polyetherketone, polyethylene terephthalate, polytrimethylene terephthalate, polyethylene naphthalate, a polyphosphazene, poly (diphenoxy phosphazene), poly{bis [2-(2-methoxyethoxy)phosphazene]}, polyurethane copolymers, polyurethane, polyether urethane, cellulose acetate, cellulose acetate butyrate, cellulose acetate propionate, polyester sulfone, polyetherimide, polycarbonate, polyphenylene sulfide, polyacrylate, and polytetrafluoroethylene.

12. The electrode-composite separator assembly of claim 1, wherein the at least one selected from an inorganic particle and an organic-inorganic particle is at least one selected from $Al_2O_3$, $SiO_2$, $B_2O_3$, $Ga_2O_3$, $TiO_2$, $SnO_2$, $BaTiO_3$, $Pb(Zr_aTi_{1-a})O_3$ wherein $0 \leq a \leq 1$, $Pb_{1-x}La_xZr_yO_3$ wherein $0<x<1$ and $0<y<1$, $Pb(Mg_3Nb_{2/3})_3$, $PbTiO_3$, $HfO_2$, $SrTiO_3$, $CeO_2$, MgO, NiO, CaO, ZnO, $Y_2O_3$, SiC, $ZrO_2$, a borosilicate, $BaSO_4$, a nanoclay, fumed silica, fumed alumina, graphite oxide, graphene oxide, and a metal-organic framework.

13. The electrode-composite separator assembly of claim 1, wherein an amount of the at least one selected from an inorganic particle and an organic-inorganic particle is about 500 parts to about 7,000 parts by weight, based on 100 parts by weight of a total weight of the copolymer comprising the first repeating unit represented by Formula 1, the second repeating unit represented by Formula 2, and the third repeating unit represented by Formula 3, and
the at least one selected from a fluorinated polymer and a heat-resistant polymer.

14. The electrode-composite separator assembly of claim 1, wherein a weight ratio of the copolymer comprising the first repeating unit represented by Formula 1, the second repeating unit represented by Formula 2, and the third repeating unit represented by Formula 3 to the at least one polymer selected from the fluorinated polymer and the heat-resistant polymer is about 1:9 to about 9:1.

15. The electrode-composite separator assembly of claim 1, wherein the composite separator has a thickness of about 5 micrometers to about 60 micrometers.

16. The electrode-composite separator assembly of claim 1, wherein the copolymer comprising the first repeating unit represented by Formula 1, the second repeating unit represented by Formula 2, and the third repeating unit represented by Formula 3 is a block copolymer.

17. The electrode-composite separator assembly of claim 1, wherein the composite separator comprises $Al_2O_3$, the copolymer represented by Formula 4a or Formula 4b, and polyvinylidene fluoride:

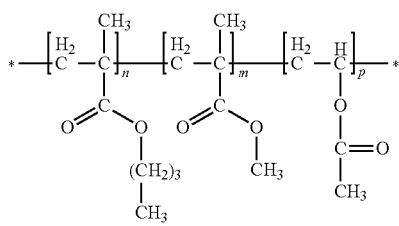

Formula 4a

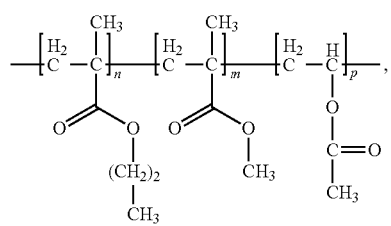

Formula 4b wherein, in Formula 4a and Formula 4b, n, m, and p are mole fractions of the first to third repeating units, respectively, and are each independently about 0.01 to about 0.99, and a sum of n, m, and p is 1.

18. The electrode-composite separator assembly of claim 1, wherein the electrode-composite separator assembly has a thermal shrinkage ratio of less than about 1% in both of a vertical direction and a horizontal direction after storage at 150° C. for 1 hour.

19. The electrode-composite separator assembly of claim 1, wherein the composite separator has a porosity of about 40% to about 60%.

20. The electrode-composite separator assembly of claim 1, wherein the copolymer comprising the first repeating unit represented by Formula 1, the second repeating unit represented by Formula 2, and the third repeating unit represented by Formula 3 has a weight average molecular weight of about 400,000 to about 1,000,000 Daltons.

21. The electrode-composite separator assembly of claim 1, wherein the copolymer comprising the first repeating unit represented by Formula 1, the second repeating unit represented by Formula 2, and the third repeating unit represented by Formula 3 has a glass transition temperature of about 30° C. to about 40° C.

22. A lithium battery comprising the electrode-composite separator assembly of claim 1.

23. The lithium battery of claim 22, wherein the lithium battery further comprises an additional separator disposed on the composite separator.

24. The lithium battery of claim 22, wherein the lithium battery further comprises a solid electrolyte, and
wherein the solid electrolyte comprises
at least one selected from an inorganic particle and an organic-inorganic particle, and
a lithium ionic conductor.

25. The lithium battery of claim 24, wherein the lithium ionic conductor is at least one selected from $Li_3N$, a lithium super ionic conductor, $Li_{3y}PO_{4-x}N_x$ wherein $0<y<3$ and $0<x<4$, a thio-lithium super ionic conductor, $Li_{3.25}Ge_{0.25}P_{0.75}S_4$, $Li_2S$, $Li_2S-P_2S_5$, $Li_2S-SiS_2$, $Li_2S-GeS_2$, $Li_2S-B_2S_5$, $Li_2S-Al_2S_5$, $Li_2O-Al_2O_3-TiO_2-P_2O_5$, a lithium lanthanum titanate, $Li_{0.34}La_{0.51}TiO_{2.94}$, a lithium titanium aluminum phosphate, and $Li_{1+x}Ti_{2-x}Al(PO_4)_3$ wherein $0 \leq x \leq 0.4$.

26. The lithium battery of claim 25, wherein the at least one selected from an inorganic particle and an organic-inorganic particle is at least one selected from $Al_2O_3$, $SiO_2$, $B_2O_3$, $Ga_2O_3$, $TiO_2$, $SnO_2$, $BaTiO_3$, $Pb(Zr_aTi_{1-a})O_3$ wherein $0 \leq a \leq 1$, $Pb_{1-x}La_xZr_yO_3$ wherein $0<x<1$ and $021$ $y<1$, $Pb(Mg_3Nb_{2/3})_3$, $PbTiO_3$, $HfO_2$, $SrTiO_3$, $CeO_2$, MgO, NiO, CaO, ZnO, $Y_2O_3$, SiC, $ZrO_2$, boron silicate, $BaSO_4$, nanoclay, fumed silica, fumed alumina, graphite oxide, graphene oxide, and a metal-organic framework (MOF).

27. The lithium battery of claim 22, wherein the lithium battery further comprises a liquid electrolyte, and
wherein the copolymer of the composite separator in the electrode-composite separator assembly comprising the first repeating unit represented by Formula 1, the second repeating unit represented by Formula 2, and the third repeating unit represented by Formula 3, is insoluble in the liquid electrolyte,

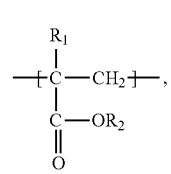

Formula 1 wherein, in Formula 1,
R$_1$ is a hydrogen or a C1-C5 alkyl group; and
R$_2$ is a C2-C20 alkyl group,
Formula 2
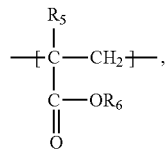
wherein in Formula 2,
R$_5$ is a hydrogen or a C1-C5 alkyl group; and
R$_6$ is a methyl group, and
Formula 3
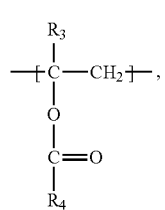
wherein in Formula 3,
R$_3$ is a hydrogen or a C1-C5 alkyl group; and
R$_4$ is a C1-C10 alkyl group.
* * * * *